(12) United States Patent  
Iwamatsu

(10) Patent No.: US 8,050,425 B2  
(45) Date of Patent: Nov. 1, 2011

(54) AUDIO SIGNAL SUPPLYING DEVICE, PARAMETER PROVIDING SYSTEM, TELEVISION SET, AV SYSTEM, SPEAKER APPARATUS, AND AUDIO SIGNAL SUPPLYING METHOD

(75) Inventor: Masayuki Iwamatsu, Hamamatsu (JP)

(73) Assignee: Yamaha Corporation (JP)

( * ) Notice: Subject to any disclaimer, the term of this patent is extended or adjusted under 35 U.S.C. 154(b) by 535 days.

(21) Appl. No.: 12/276,314

(22) Filed: Nov. 22, 2008

(65) Prior Publication Data

US 2009/0147134 A1 Jun. 11, 2009

(30) Foreign Application Priority Data

Nov. 22, 2007 (JP) ................................. 2007-303726

(51) Int. Cl.  
*H04R 3/00* (2006.01)

(52) U.S. Cl. ............... 381/98; 381/74; 381/77; 381/111; 381/335

(58) Field of Classification Search .................... 381/59, 381/89, 77, 81, 82, 104, 107, 111, 123  
See application file for complete search history.

(56) References Cited

U.S. PATENT DOCUMENTS

| 2002/0012437 A1* | 1/2002 | Murata et al. .................... 381/98 |
| 2005/0117758 A1* | 6/2005 | Wakabayashi ................ 381/104 |
| 2005/0169488 A1* | 8/2005 | Kato et al. ....................... 381/98 |

FOREIGN PATENT DOCUMENTS

JP 2004-064172 A 2/2004

* cited by examiner

*Primary Examiner* — Dung A. Le  
(74) *Attorney, Agent, or Firm* — Rossi, Kimms & McDowell LLP

(57) ABSTRACT

An audio signal supplying device includes a connection terminal which is connected to a speaker unit and which outputs an audio signal to the speaker unit, a specifying section which specifies a type of the speaker unit connected to the connection terminal, an acquiring section which acquires a parameter corresponding to the type of the speaker unit specified by the specifying section from an outside, a storing section which stores the parameter acquired by the acquiring section, an inputting section into which the audio signal is input, an acoustic characteristic controlling section which adjusts an acoustic characteristic of the audio signal input into the inputting section based on the parameter stored in the storing section, and a supplying section which supplies the audio signal whose acoustic characteristic is adjusted by the acoustic characteristic controlling section to the connection terminal.

15 Claims, 16 Drawing Sheets

AUDIO SIGNAL SUPPLYING DEVICE, PARAMETER PROVIDING SYSTEM, TELEVISION SET, AV SYSTEM, SPEAKER APPARATUS, AND AUDIO SIGNAL SUPPLYING METHOD

BACKGROUND

The present invention relates to the technology to control a sound quality in employing external speakers.

During watching television, a user of a television set listens to sounds from built-in speakers of the television set or headphones. At this time, when the sounds are emitted from the built-in speakers of the television set and the sounds are emitted from the headphones, respective frequency characteristics of the built-in speakers of the television set and the headphones are different. Therefore, when the built-in speakers and the headphones are switched in use, there exists the technology to correct frequency characteristics of audio signals in response to respective frequency characteristics and then emit the sounds (Patent Literature 1, for example).
[Patent Literature 1] JP-A-2004-64172

Meanwhile, nowadays a flat large-screen television set such as a liquid crystal display, or the like is becoming the mainstream of the television set, and the slimming down and the larger screen are advancing year by year. Since such a design is employed that an area of a display screen is increased in size in contrast to the housing of the television set, the narrower frame is also advancing. The internal speakers being arranged in the frame position up to now must be reduced in size correspondingly, and thus a tone quality becomes worse. In this situation, when the user of such television set cannot be satisfied with this tone quality, such user often watches the television while using the speaker unit of the high tone quality provided to the outside. Also, the user provides plural types of speaker units, and then uses an adequate speaker unit individually to suit the listening contents.

Here, in the technology disclosed in Patent Literature 1, even when the type of the headphones connected to the television set is changed, the corrected contents of the frequency characteristic of the audio signal are not changed, but the desired sound can be emitted because the frequency characteristic of the headphones is not so largely changed. In contrast, when not the headphones but the speaker units are employed, the frequency characteristic is often largely different depending on the type. However, in the television set using the technology disclosed in Patent Literature 1, even when the type of the speaker units connected to the television set is changed, the corrected contents of the frequency characteristic of the audio signal are never changed, so that the desired sound cannot be emitted.

In this manner, the speaker units connected externally often have various frequency characteristics in simply emitting the sound depending on the type. Therefore, a tone quality controlling circuit for correcting the audio signal must be provided to get the desired frequency characteristic, which acts as a factor of high cost. Also, when the speaker unit is built in the television stand, a load on the tone quality controlling circuit can be reduced by devising a layout of the speakers whereas a margin of an outside design is restricted on account of a limitation on the layout of the speakers.

SUMMARY

The present invention has been made in view of the above circumstances, and it is an object of the present invention to provide an audio signal supplying device, a parameter providing system, a television set, an AV System, a speaker apparatus, and an audio signal supplying method, capable of providing an externally connected external speaker unit of free design at a low cost.

In order to solve the above problem, the present invention provided an audio signal supplying device, comprising:

a connection terminal which is connected to a speaker unit and which outputs an audio signal to the speaker unit;

a specifying section which specifies a type of the speaker unit connected to the connection terminal;

an acquiring section which acquires a parameter corresponding to the type of the speaker unit specified by the specifying section from an outside;

a storing section which stores the parameter acquired by the acquiring section;

an inputting section into which the audio signal is input;

an acoustic characteristic controlling section which adjusts an acoustic characteristic of the audio signal input into the inputting section, based on the parameter stored in the storing section; and a supplying section which supplies the audio signal whose acoustic characteristic is adjusted by the acoustic characteristic controlling section to the connection terminal.

Preferably, the audio signal supplying device further comprises an identifying section which identifies the type of the speaker unit connected to the connection terminal. The specifying section specifies the type of the speaker unit identified by the identifying section as the type of the speaker unit connected to the connection terminal.

Preferably, the identifying section identifies the type of the speaker unit connected to the connection terminal by measuring a resistance value of an identification resistor provided in the speaker unit.

Preferably, the identifying section identifies the type of the speaker unit connected to the connection terminal by optically reading a figure attached to the speaker unit.

Preferably, the identifying section identifies the type of the speaker unit connected to the connection terminal by acquiring identification information stored in a storing section in the speaker unit.

Preferably, the identifying section has a radio communicating section, the identifying section transmits information indicating the type of the identified speaker unit to the specifying section via the radio communicating section, and the specifying section receives the information transmitted by the radio communicating section, and specifies a type of the speaker unit indicated by the information as the type of the speaker unit connected to the connection terminal.

Preferably, the audio signal supplying device further comprises a deciding section that decides whether or not a parameter corresponding to the type of the speaker unit which is specified by the specifying section is stored in the storing section. When the deciding section decides that the parameter corresponding to the type of the speaker unit specified by the specifying section is not stored in the storing section, the acquiring section acquires the parameter corresponding to the type of the speaker unit from the outside. The storing section stores the type of the speaker unit corresponding to the parameter and the parameter so as to correlate mutually every time when the acquiring section acquires the parameter. The acoustic characteristic controlling section adjusts the acoustic characteristic based on the parameter corresponding to the type of the speaker unit specified by the specifying section, out of parameters stored in the storing section.

Preferably, the acquiring section transmits request information indicating the type of the speaker unit specified by the specifying section to a server connected to a network, and acquires the parameter corresponding to the type of the speaker unit connected to the connection terminal by receiving the parameter transmitted from the server in response to the request.

Preferably, the acquiring section acquires the parameter corresponding to the type of the speaker unit connected to the connection terminal by reading the parameter stored in the storing section of the speaker unit connected to the connection terminal.

Also, the present invention provides a parameter providing system, comprising:

an audio signal supplying device; and
a server which is connected to the audio signal supplying device through a network,
wherein the audio signal supplying device, including:
a connection terminal which is connected to a speaker unit and which outputs an audio signal to the speaker unit;
a specifying section which specifies a type of the speaker unit connected to the connection terminal;
an acquiring section transmits request information indicating the type of the speaker unit specified by the specifying section to the server through the network and acquires the parameter corresponding to the type of the speaker unit connected to the connection terminal by receiving the parameter transmitted from the server in response to the request;
an inputting section into which the audio signal is input;
an acoustic characteristic controlling section which adjusts an acoustic characteristic of the audio signal input into the inputting section, based on the parameter received by the receiving section; and
a supplying section which supplies the audio signal whose acoustic characteristic is adjusted by the acoustic characteristic controlling section to the connection terminal,
wherein the server, including:
a server storing section which stores a plurality of parameters corresponding to types of the speaker units; and
a transmitting section which transmits the parameter corresponding to the type of the speaker unit indicated by the request information through the network, out of parameters stored in the server storing section, to the audio signal supplying device.

Also, the present invention provides a television set, comprising:

the audio signal supplying device;
a displaying section which displays an image on a display screen based on an input video signal; and
an internal speaker arranged in a vicinity of the display screen, and which emits a sound based on the supplied audio signal,
wherein the storing section stores a parameter corresponding to the internal speaker;
wherein the supplying section supplies the audio signal whose acoustic characteristic is adjusted by the acoustic characteristic controlling section to the connection terminal or the internal speaker; and
wherein the acoustic characteristic controlling section adjusts the acoustic characteristic based on the parameter corresponding to the internal speaker stored in the storing section, when the supplying section supplies the audio signal to the internal speaker.

Also, the present invention provides an AV system, comprising:

the television set; and
a television stand equipped with a speaker apparatus connected to the connection terminal.

Also, the present invention provides a speaker apparatus connected to an audio signal supplying device which supplies an audio signal whose acoustic characteristic is adjusted on the basis of a parameter to the speaker apparatus, the parameter being acquired from the speaker apparatus to the audio signal supplying device, the speaker apparatus comprising:

an inputting section connected to a connection terminal of the audio signal supplying device and to which the audio signal is input through the connection terminal;
a speaker which emits a sound based on the audio signal input from the inputting section; and
a storing section which stores parameters used in the audio signal supplying device.

Also, the present invention provides a speaker apparatus connected to an audio signal supplying device which specifies a type of the speaker apparatus based on a measured result of a resistance value of an identification resistor provided in the speaker apparatus, acquires a parameter corresponding to the specified type of the speaker apparatus from the speaker apparatus to the audio signal supplying device, and supplies an audio signal whose acoustic characteristic is adjusted on the basis of the acquired parameter, the speaker apparatus comprising:

an inputting section connected to a connection terminal of the audio signal supplying device and to which the audio signal is input through the connection terminal;
a speaker which emits a sound based on the audio signal input from the inputting section;
an identification resistor which shows a predetermined resistance value; and
a measuring terminal which connects the identification resistor to the audio signal supplying device.

Also, the present invention provides an audio signal supplying method applied to an audio signal supplying device equipped with a connection terminal to which a speaker unit is connected and which outputs an audio signal to the speaker unit, comprising:

specifying a type of the speaker unit connected to the connection terminal;
acquiring a parameter corresponding to the type of the speaker unit specified in the specifying process from an outside;
storing the parameter acquired in the acquiring process in a storing section;
inputting the audio signal;
adjusting an acoustic characteristic of the audio signal input in the inputting process, based on the parameter stored in the storing section; and
supplying the audio signal whose acoustic characteristic is adjusted in the acoustic characteristic controlling process to the connection terminal.

According to the present invention, the audio signal supplying device, the parameter providing system, the television set, the AV System, the speaker apparatus, and the audio signal supplying method, capable of providing the external speaker unit that is connected externally and is of free design at a low cost can be provided.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

An embodiment of the present invention will be explained hereinafter.

Embodiment

Figure 1:
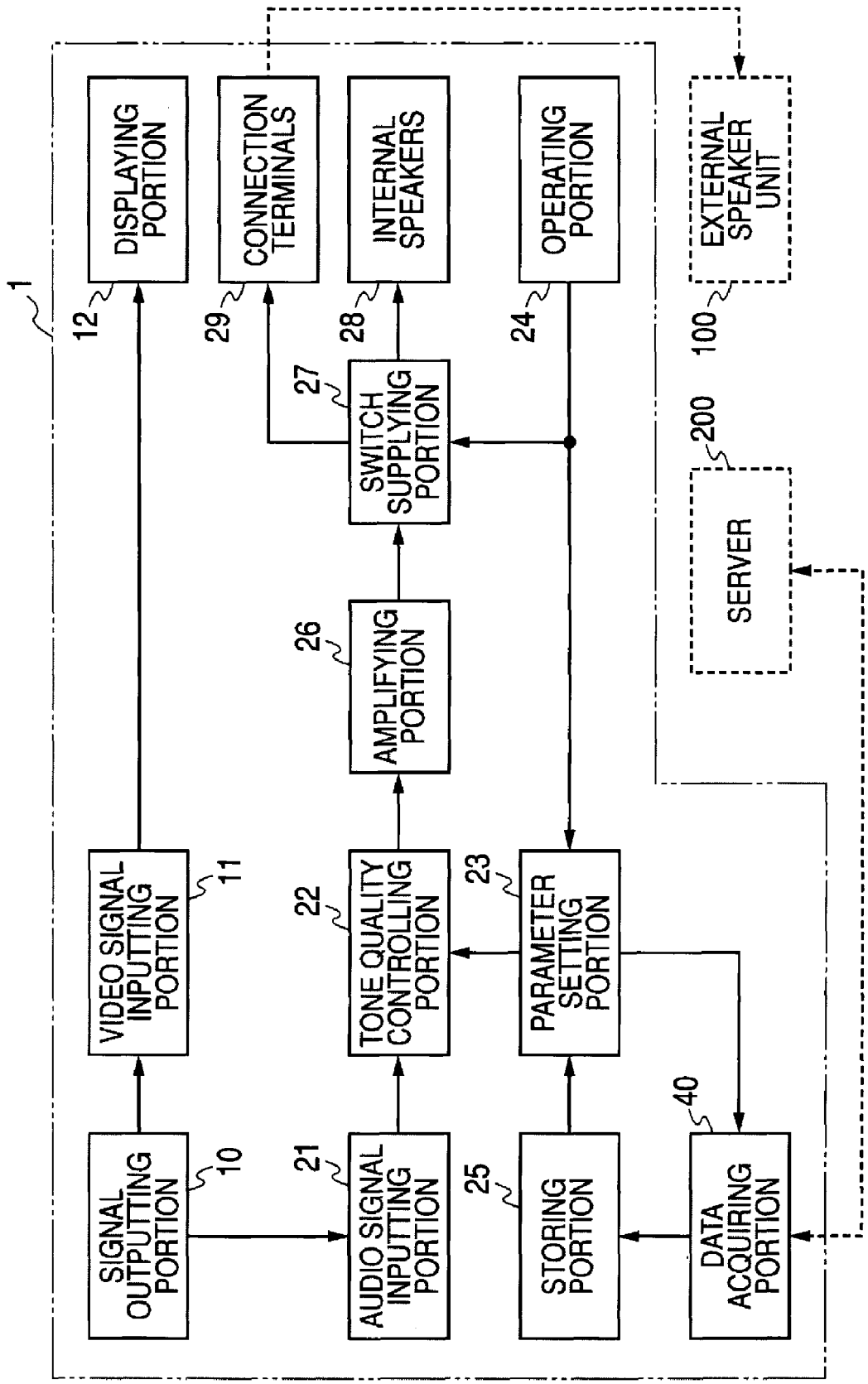
FIG. 1 is a block diagram showing a configuration of a television set according to an embodiment of the present invention.
Figure 2:
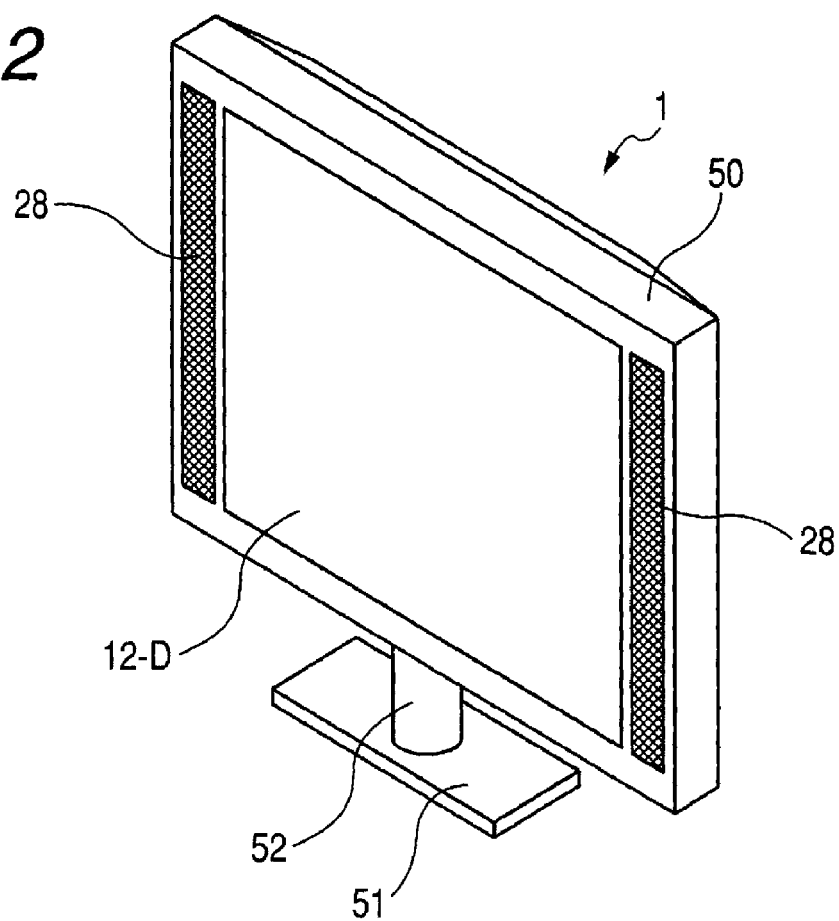
FIG. 2 is an explanatory view showing an example of an external appearance of the television set according to the embodiment.

A television set 1 according to the embodiment of the present invention is a flat television set such as a liquid crystal display, a plasma display, an organic EL display, or the like, and is equipped with speakers in the inside and terminals to which the speaker unit is connected on the outside. A configuration of the television set 1 will be explained by reference to FIG. 1 and FIG. 2 hereinafter. FIG. 1 is a block diagram showing a configuration of the television set 1, and FIG. 2 is an explanatory view showing an external appearance of the television set 1. The television set 1 has a CPU (Central Processing Unit) (not shown), and this CPU controls respective portions of the television set 1.

A signal outputting portion 10 receives data from a TV tuner, a DVD (Digital Versatile Disc) player, or the like, and generates a video signal and an audio signal under control of the CPU (not shown). Then, the signal outputting portion 10 outputs the video signal to a displaying portion 12 via a video signal inputting portion 11, and outputs the audio signal to a tone quality controlling portion 22 via an audio signal inputting portion 21.

The displaying portion 12 is a display device such as a liquid crystal display, a plasma display, an organic EL display, or the like, and makes a display based on the video signal being input from the video signal inputting portion 11 on a display screen 12-D. As shown in FIG. 2, the display screen 12-D is arranged in front of a housing 50.

The tone quality controlling portion 22 controls the acoustic characteristic of the audio signal being input from the audio signal inputting portion 21, based on the parameter set by a parameter setting portion 23 described later. In the present embodiment, the acoustic characteristic corresponds to the frequency characteristic, and the tone quality controlling portion 22 is an equalizer that controls the frequency characteristic of the audio signal based on the set parameter. Then, the tone quality controlling portion 22 outputs the audio signal whose frequency characteristic has been controlled to an amplifying portion 26.

An operating portion 24 has a remote controller. When the user of the television set 1 operates the operating portion 24, the information representing the operation contents is output to the CPU (not shown). The operating portion 24 outputs switch information indicating the internal speaker or the connection terminal to the parameter setting portion 23 or a switch supplying portion 27 in response to the operation indicating whether the sound should be emitted from internal speakers 28 of the television set 1 or the sound should be emitted from an external speaker unit 100 connected to connection terminals 29. Here, the remote controller has operation keys and a radio communicating section for transmitting a signal responding to the operation of the operation keys via radio, infrared ray, or the like. The operating portion 24 has a receiving section for receiving the signal transmitted from the remote controller. Then, the operating portion 24 discriminates the operation contents based on the signal that the receiving section received.

Also, when the operating portion 24 is operated to input the type of the external speaker unit 100 connected to the connection terminals 29, such operating portion 24 outputs type information indicating this type to the parameter setting portion 23. In this case, in selecting or inputting operation, a display indicating the selected contents or the input contents may be made on the display screen 12-D of the displaying portion 12. Also, the user may cause the displaying portion 12 to display the types of the external speaker units 100 whose external speaker parameters are stored in a storing portion 25, described later, on the display screen 12-D, and may input the type of the to-be-selected external speaker unit 100 by selecting the type from those displayed on the display screen 12-D. At this time, when the to-be-selected external speaker unit 100 is not displayed on the display screen 12-D, the user may input the type by operating the operating portion 24.

Figure 3:
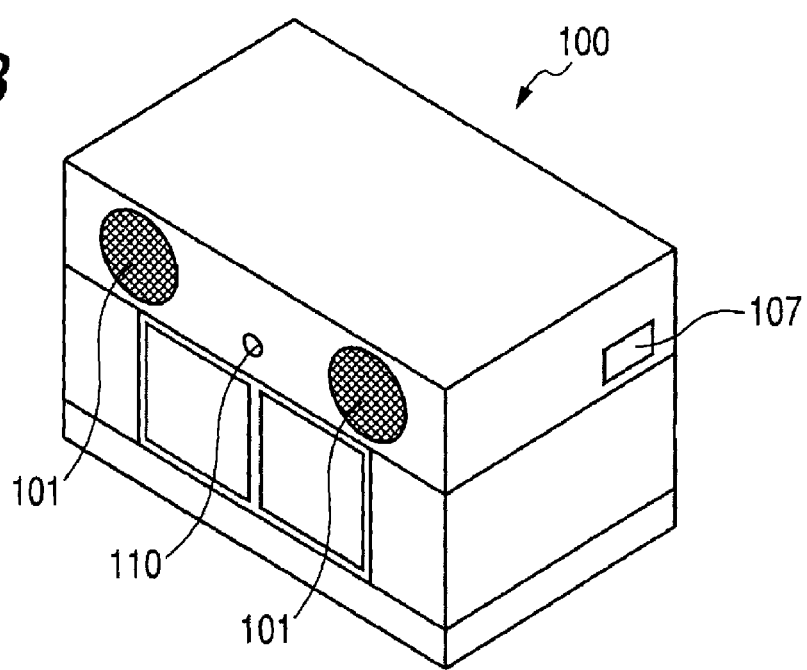
FIG. 3 is an explanatory view showing an example of an external appearance of an external speaker unit according to the embodiment.

Here, various speaker units can be employed as the external speaker unit 100. For example, as shown in FIG. 3, the external speaker unit 100 is a television stand to which two speakers 101 are provided. This external speaker unit 100 does not contain the circuit that controls the acoustic characteristic such as the frequency characteristic of the audio signal, or the like, the amplifier, etc., and emits the sounds based on the audio signals fed to respective speakers 101 as they are. In this manner, since the external speaker unit 100 does not have the circuit for controlling the acoustic characteristic, etc., a low-cost speaker unit can be fabricated.

Figure 4:
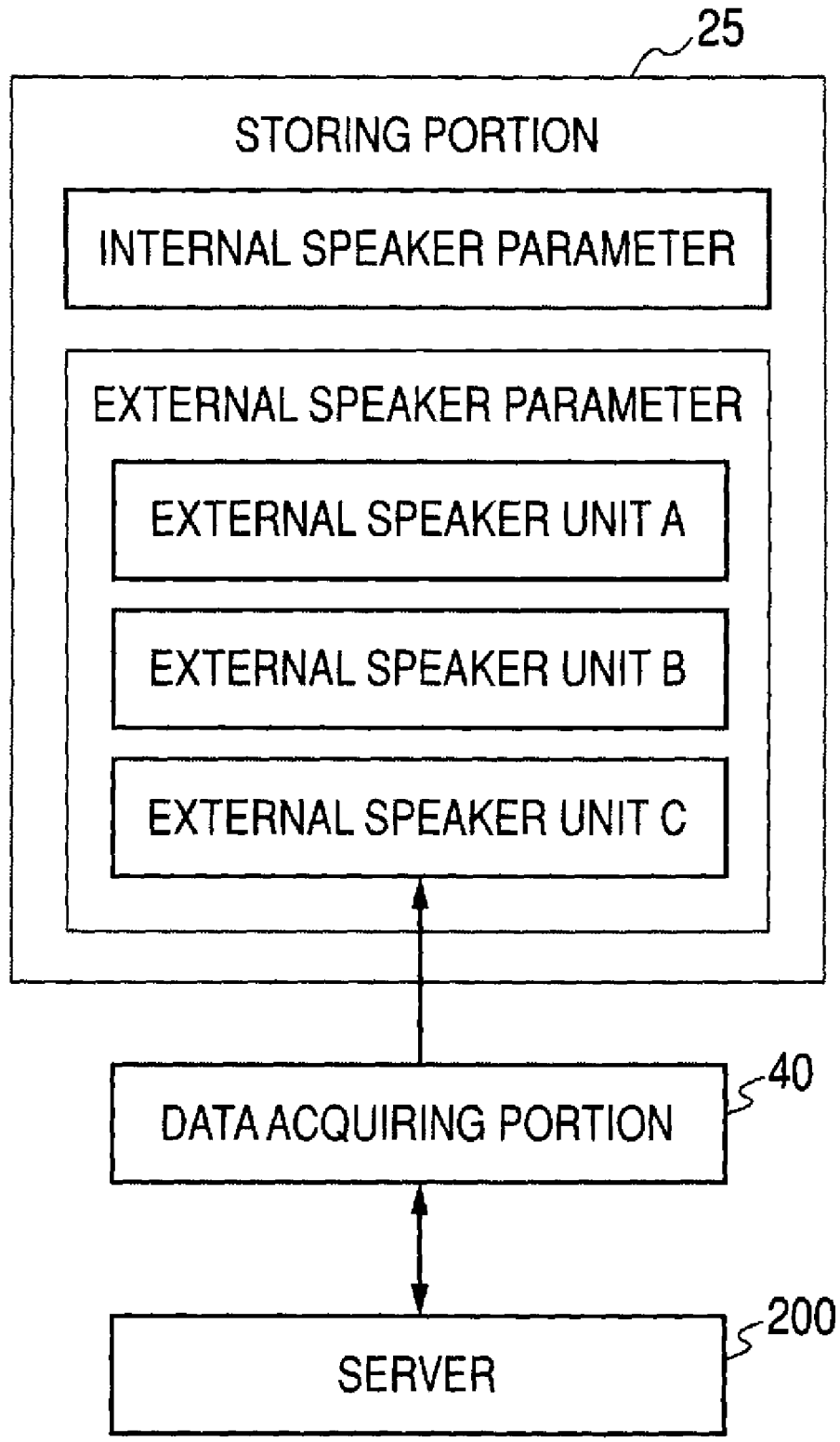
FIG. 4 is an explanatory view of stored contents in a storing portion according to the embodiment.

The parameters to be set in the tone quality controlling portion 22 are stored in the storing portion 25. As shown in FIG. 4, internal speaker parameters generated based on the frequency characteristic of the internal speakers 28, and external speaker parameters generated based on the peculiar frequency characteristic that the external speaker units 100 possess are stored in the storing portion 25. In particular, as for the external speaker parameters, external speaker parameters corresponding to the types of the external speaker units are stored as an "external speaker unit A" and an "external speaker unit B". That is, out of the external speaker parameters, the parameter corresponding to the "external speaker unit A" is given as the "external speaker unit A"-dedicated parameter generated based on the frequency characteristic peculiar to the "external speaker unit A". This parameter indicates to what extent a gain should be controlled in respective frequency bands, and the tone quality controlling portion 22 controls the frequency characteristic of the input audio signal in response to the contents that the set parameter indicates. Here, it is assumed in the present embodiment that the type of the external speaker unit indicates the type of the external speaker unit 100. In this case, the type of the external speaker unit may indicate individual unit of the same models of the external speaker unit 100. In this case, the external speaker parameter can be set in response to individual difference of individual frequency characteristics respectively. Also, the type of the external speaker unit may be given as a combination of plural types of the external speaker unit 100. Also, if respective types having the same frequency characteristic are set as the same type, such a situation can be avoided that redundant parameters are stored. In this manner, the classification of the types of the external speaker unit may be made such that the external speaker units 100 whose peculiar frequency characteristics are the same or are regarded as the same are set as one type.

Also, as described later, when the external speaker parameter corresponding to the type of the external speaker unit 100 not stored in the storing portion 25 is acquired by a data acquiring portion 40, the storing portion 25 stores the external speaker parameter and the type of the external speaker unit 100 corresponding to this parameter while correlating them with each other. At this time, a part of the parameters may be erased by limiting the number of pieces of the stored parameters based on frequency in use, period of use, volume of memory, and the like.

The parameter setting portion 23 reads the parameter from the storing portion 25, based on the switch information and the type information being output from the operating portion 24, and sets this parameter to the tone quality controlling portion 22. When the switch information indicating the internal speakers is input, the parameter setting portion 23 reads the internal speaker parameter from the storing portion 25 and sets the parameter in the tone quality controlling portion 22 to cause the internal speakers to emit the sound. In contrast, the switch information indicates the connection terminals, the parameter setting portion 23 reads the external speaker parameter from the storing portion 25. At this time, the parameter setting portion 23 reads the external speaker parameter corresponding to the type of the external speaker unit that the input type information indicates, and sets the parameter in the tone quality controlling portion 22. For example, when the type information indicates the "external speaker unit B", the parameter setting portion 23 reads the parameter corresponding to the "external speaker unit B" out of the external speaker parameters, and sets the parameter in the tone quality controlling portion 22.

Here, the parameter setting portion 23 decides whether or not the external speaker parameter corresponding to the type of the external speaker unit 100 indicated by the type information should be stored in the storing portion 25. Then, when decided that the external speaker parameter is not stored, the parameter setting portion 23 outputs the type information being input from the operating portion 24 to the data acquiring portion 40. Then, when the data acquiring portion 40 acquires the external speaker parameter corresponding to the type of the external speaker unit 100 indicated by the type information and stores newly the parameter in the storing portion 25 as described later, the parameter setting portion 23 reads the external speaker parameter stored newly in the storing portion 25 and sets the parameter in the tone quality controlling portion 22. In this case, when the data acquiring portion 40 cannot acquire the external speaker parameter corresponding to the type of the external speaker unit 100, the parameter whose frequency characteristic is flat may be set in the tone quality controlling portion 22.

The data acquiring portion 40 is a communicating section that communicates with a server 200 via the network, requests the server 200 to transmit a predetermined external speaker parameter, and receives the requested external speaker parameter. The data acquiring portion 40, when received the type information from the parameter setting portion 23, acquires the external speaker parameter by communicating with the server 200 and receiving the external speaker parameter corresponding to the type of the external speaker unit 100 indicated by the type information from the server 200. Here, the request-to-send of the external speaker parameter is made from the data acquiring portion 40 by sending out the request information containing the information being input from the parameter setting portion 23 and indicating the type of the external speaker unit 100 indicated by the type information. Then, as shown in FIG. 4, the data acquiring portion 40 stores the acquired external speaker parameter in the storing portion 25 while correlating with the type of the external speaker unit 100 (an "external speaker unit C" in the recitation in FIG. 4) corresponding to the parameter.

Here, the server 200 has a storing section for storing the external speaker parameters corresponding to various types of the external speaker unit 100, and a communicating section for communicating with other equipment via the network. When the request-to-send of the external speaker parameter is made by the data acquiring portion 40, the server 200 checks whether or not the requested parameter exists in the storing section in which the external speaker parameters are stored. The server 200 transmits the concerned parameter when the requested parameter exists, or transmits the information indication such an effect that the concerned parameter does not exist when the requested parameter does not exist.

The amplifying portion 26 is an amplifier that amplifies the input audio signal at a predetermined amplification factor, and outputs the amplified audio signal to the switch supplying portion 27. The predetermined amplification factor is changed in response to a sound volume value that is set by operating the operating portion 24, a volume control (not shown), etc.

The switch supplying portion 27 outputs the input audio signal to the internal speakers 28 or the connection terminals 29 in response to the contents of the switch information from the operating portion 24. That is, when the switch information indicates the internal speakers, the switch supplying portion 27 supplies the audio signal being input from the amplifying portion 26 to the internal speakers 28. In contrast, when the switch information indicates the connection terminals, the switch supplying portion 27 supplies the audio signal being input from the amplifying portion 26 to the connection terminals 29.

The internal speakers 28 emit the sound based on the supplied audio signal. This audio signal gives the audio signal whose frequency characteristic has already been controlled based on the internal speaker parameter in the tone quality controlling portion 22.

As shown in FIG. 2, the internal speakers 28 are arranged in the peripheral portion of the display screen 12-D. In the present embodiment, the internal speakers 28 are arranged in the inside of the housing 50 and on the left and right sides of the display screen 12-D. Also, the opening portions through which the sound is emitted from the internal speakers 28 in the housing 50 to the outside are provided in the front direction of the housing 50. The area in which the internal speakers 28 are arranged is very smaller than an area of the display screen 12-D, and such area is provided in a part of the area except the display screen 12-D (referred to as a "frame" hereinafter) in the front direction of the housing 50. Then, the housing 50 is supported by a rotary shaft body 52 of a foot stand 51.

In this manner, such a design is employed that a rate of the area of the display screen 12-D to a size of the whole television set 1 is set large, and the frame is set very narrow. Therefore, a volume of a frame space in which the speaker must be arranged is narrow, and thus the speaker capable of emitting the sound of the high quality cannot be employed. Here, the present embodiment shows merely one example. The arranged area of the internal speakers 28 is not limited to the housing 50 that has the display screen 12-D thereon, and the internal speakers 28 may be arranged in another housing that is connected to the housing 50 that has the display screen 12-D thereon. Also, various modes of the direction of the opening portions, the arranging direction of the speakers may be employed in response to the design.

The external speaker unit 100 of various types is connected to the connection terminals 29, and the connection terminals 29 output the supplied audio signal to the connected external speaker unit 100. This audio signal gives the audio signal whose frequency characteristic has been controlled based on the external speaker parameter in the tone quality controlling portion 22. With the above, a configuration of the television set 1 is explained.

Next, an operation of the television set 1 will be explained hereunder. The external speaker unit 100 is connected to the connection terminals 29 of the television set 1. It is assumed that the type of this external speaker unit is the "external speaker unit C". Also, it is assumed that, as shown in FIG. 4, the external speaker parameters corresponding to the "external speaker unit A" and the "external speaker unit B" are stored in the storing portion 25.

When the user of the television set 1 wishes to emit the sound from the internal speakers 28 and selects the internal speakers by operating the operating portion 24, the switch information indicating the internal speakers is output from the operating portion 24 to the parameter setting portion 23 and the switch supplying portion 27. Then, the internal speaker parameter is set in the tone quality controlling portion 22. Accordingly, the sound based the audio signal whose frequency characteristic has been controlled based on the internal speaker parameter is emitted from the internal speakers 28.

When the user wishes to emit the sound from the external speaker unit 100, such user selects the connection terminals by operating the operating portion 24 and inputs the "external speaker unit C" indicating the type of the external speaker unit 100 connected to the connection terminals 29. Accordingly, the switch information indicating the connection terminals is output from the operating portion 24 to the parameter setting portion 23 and the switch supplying portion 27. Also, the type information indicating the "external speaker unit C" is output to the parameter setting portion 23.

When the parameter setting portion 23 decides that the external speaker parameter corresponding to the "external speaker unit C" to be read is not stored in the storing portion 25, such parameter setting portion 23 outputs the type information indicating the "external speaker unit C" to the data acquiring portion 40.

The data acquiring portion 40, when received the type information from the parameter setting portion 23, communicates with the server 200 via the network, and then requests the server 200 to transmit the external speaker parameter corresponding to the "external speaker unit C" that this type information indicates. The data acquiring portion 40, when received the external speaker parameter corresponding to the "external speaker unit C" from the server 200, stores this external speaker parameter in the storing portion 25 as the external speaker parameter corresponding to the "external speaker unit C".

Then, when the external speaker parameter corresponding to the "external speaker unit C" is stored in the storing portion 25, the parameter setting portion 23 reads this external speaker parameter and sets it in the tone quality controlling portion 22. Accordingly, the audio signal whose frequency characteristic has been controlled based on the external speaker parameter corresponding to the "external speaker unit C" is supplied to the connection terminals 29.

This audio signal is input into the external speaker unit 100 from the connection terminals 29, and the external speaker unit 100 emits the sound based on the audio signal. Here, the audio signal is not supplied to the internal speakers 28, and thus no sound is emitted from the internal speakers 28.

The type of the external speaker unit 100 connected to the connection terminals 29 is assumed herein as the "external speaker unit C". In this case, when the type of the external speaker unit 100 connected to the connection terminals 29 is changed to the "external speaker unit A", for example, the user may input the "external speaker unit A" by operating the operating portion 24 and may change the parameter to be set in the tone quality controlling portion 22 into the external speaker parameter corresponding to the "external speaker unit A" stored in the storing portion 25.

In this manner, in the television set 1 according to the embodiment of the present invention, with regard to the parameters required to control the frequency characteristic of the audio signal set in the tone quality controlling portion 22, the external speaker parameter corresponding to the type of the external speaker unit 100 is stored in plural in the storing portion 25 apart from the internal speaker parameters. When the external speaker parameter corresponding to the type of the external speaker unit 100 connected to the connection terminals 29 is selected and set in the tone quality controlling portion 22, the sound having the similar frequency characteristic can be emitted even though the type of the external speaker unit 100 is changed.

Then, since the frequency characteristic is controlled in the television set 1 instead of the control of the frequency characteristic of the audio signal in the external speaker unit 100, there is no need to employ the acoustic characteristic controlling circuit in the external speaker unit 100, and a low cost unit can be employed. Also, since there is no need to make the control of the frequency characteristic by the layout of the speakers, a margin of the design of the external speaker unit 100 can be improved.

Also, the sound can be emitted while making full use of the frequency characteristic of the external speaker unit 100 itself. In other words, in the common external speaker unit 100, the frequency characteristic is controlled such that an output in the frequency band whose sensitivity is high is suppressed to agree with the frequency band whose sensitivity is low. In contrast, the external speaker unit 100 connected to the television set 1 according to the embodiment of the present invention does not need such control. The sound in the frequency band whose sensitivity is high can be still emitted as the sound with high sensitivity, and thus the sound can be emitted effectively.

Also, even though the external speaker parameter corresponding to the type of the external speaker unit 100 connected to the connection terminals 29 is not stored in the storing portion 25, the data acquiring portion 40 can acquire this external speaker parameter from the server 200 via the network. Therefore, the television set 1 according to the embodiment can handle various types of the external speaker unit 100. As a result, even when the external speaker unit 100 that was developed after the production of the television set 1 according to the embodiment of the present invention is employed, the external speaker parameter corresponding to the type of the external speaker unit 100 can be set in the tone quality controlling portion 22.

Figure 5A:
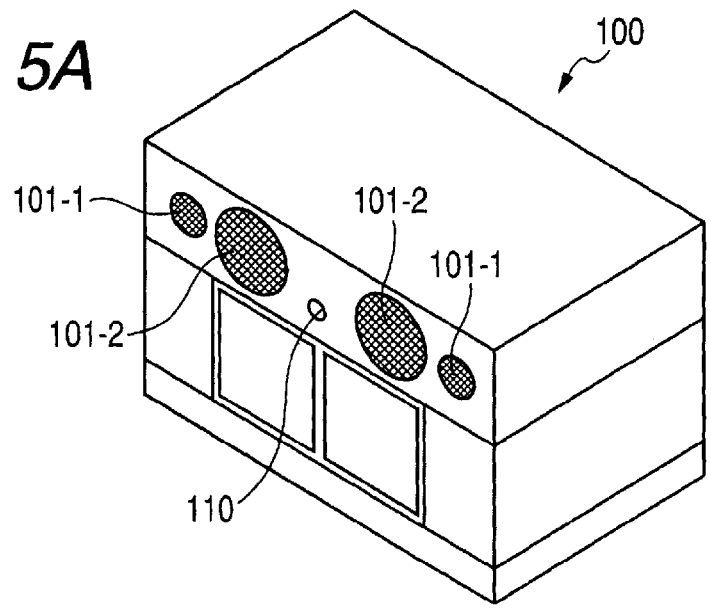
FIGS. 5A to 5C are explanatory views showing an example of an external appearance of the external speaker unit and examples of the frequency characteristic according to the embodiment.
Figure 5B:
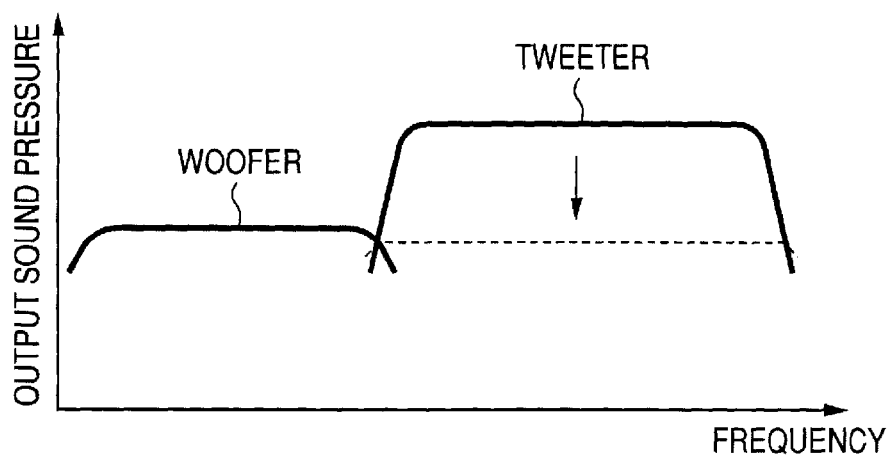
Figure 5C:
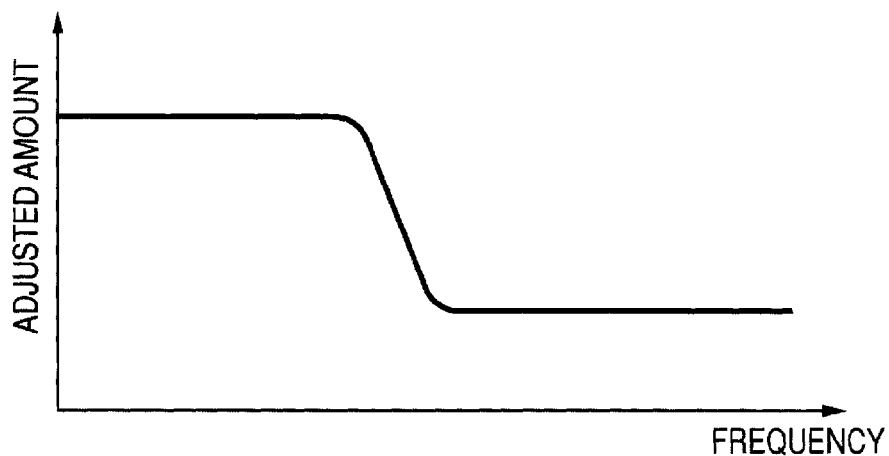
Figure 6A:
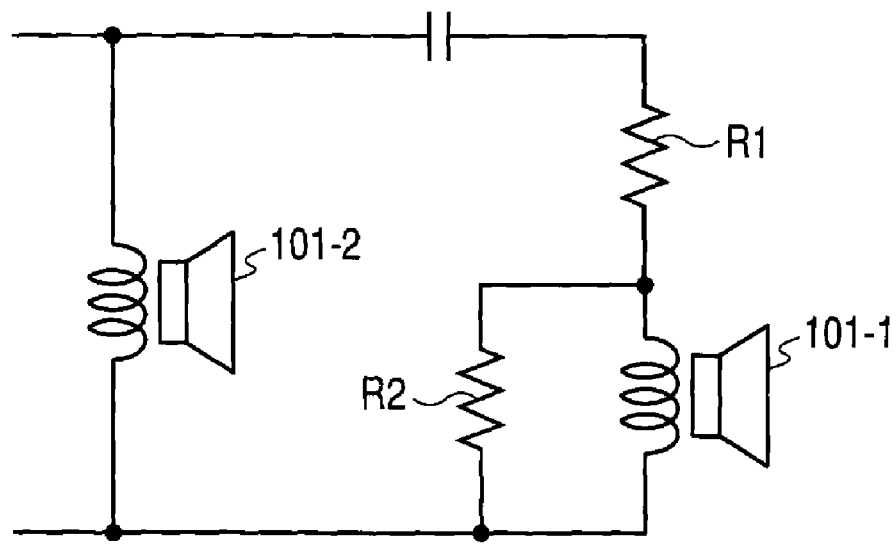
FIG. 6A is an explanatory view showing a conventional circuit configuration of the external speaker unit and FIG. 6B is an example of a circuit configuration of the external speaker unit according to the embodiment.

Next, concrete examples of such an effect that the sound can be emitted effectively will be explained with reference to FIGS. 5A to 5C and FIGS. 6A and 6B hereunder. As shown in FIG. 5A, the external speaker unit 100 has tweeters 101-1 for emitting the sound in the high frequency band, and woofers 101-2 for emitting the sound in the low frequency band. Even when the audio signal having the same output level in respective frequency bands is input into the tweeters 101-1 and the woofers 101-2, an output sound pressure is different in the frequency bands respectively due to difference in efficiency between the tweeter 101-1 and the woofer 101-2, as indicated with solid line in FIG. 5B, and in some cases a sensitivity to the input audio signal is different. In the prior art, the efficiency of the speaker whose efficiency is high (the tweeter 101-1 in the case in FIG. 5A) was lowered to the characteristic indicated with a broken line to prevent the situation that a sensitivity is different in respective frequency bands. This is implemented by resistors R1, R2, as shown in FIG. 6A, for example.

Figure 6B:
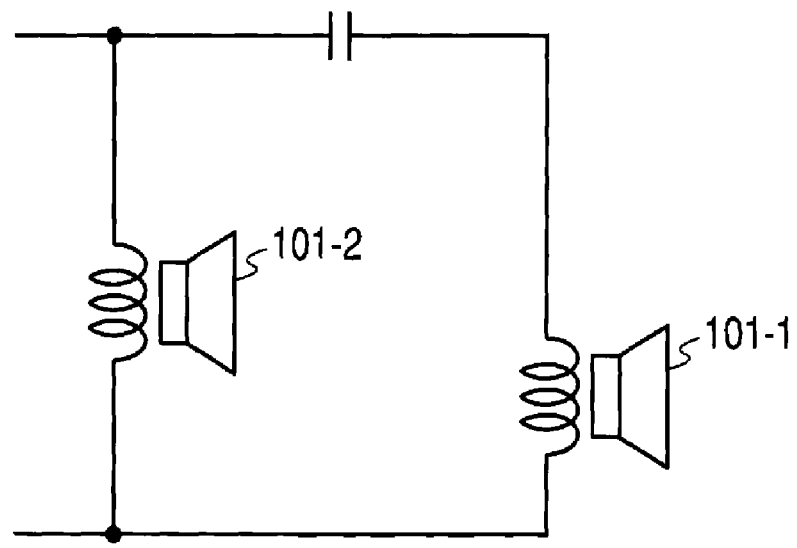

In contrast, in the television set 1 according to the embodiment of the present invention, the audio signal can be controlled in the tone quality controlling portion 22 in response to the type of the external speaker unit 100 connected to the connection terminals 29. When the external speaker unit 100 has the frequency characteristic indicated with the solid line in FIG. 5B, the external speaker parameter corresponding to the type of the external speaker unit 100 is given as the parameter to increase relatively the output level of the audio signal in the low frequency band, as shown in FIG. 5C. Then, the tone quality controlling portion 22 controls the frequency characteristic of the audio signal in response to this parameter. Thus, as shown in FIG. 6B, the external speaker unit 100 can eliminate the frequency dependency of the output sound pressure without the resistors R1, R2 even when the speaker whose efficiency is high is employed as it is. Accordingly, a driving power of the external speaker unit 100 can be reduced, and an efficient sound emission can be done.

With the above, the embodiment of the present invention is explained. But the present invention can be carried out in various modes as explained hereunder.

<Variation 1>

Figure 7:
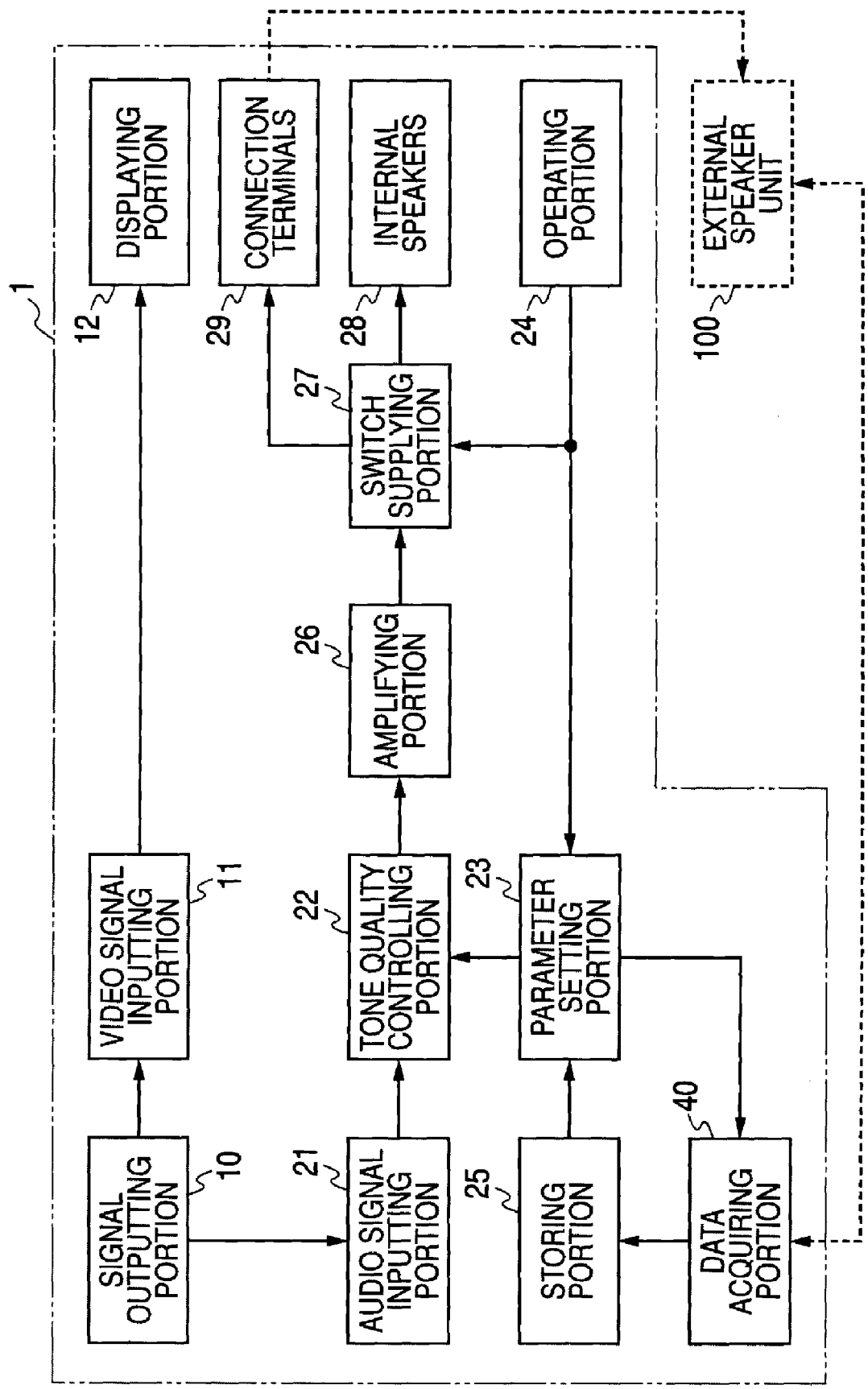
FIG. 7 is a block diagram showing a configuration of a television set according to a variation 1 of the embodiment.
Figure 8:
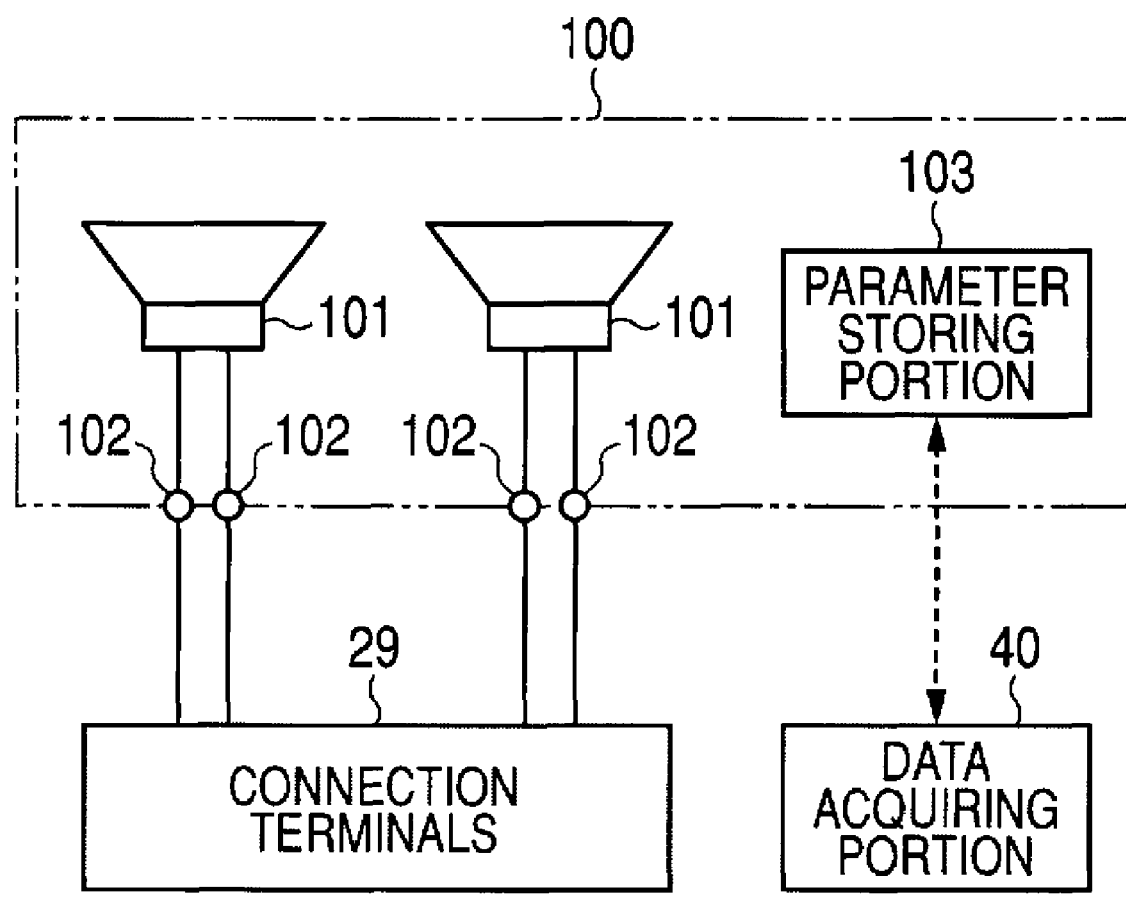
FIG. 8 is a block diagram showing an example of a configuration of an external speaker unit according to the variation 1.

In the above embodiment, the data acquiring portion 40 acquires the external speaker parameter from the server 200 via the network, but may acquire the parameter from the equipment except the server 200. For example, as shown in FIG. 7, the data acquiring portion 40 may acquire the external speaker parameter from the external speaker unit 100 connected to the connection terminals 29. In this case, a configuration of the external speaker unit 100 may have a configuration shown in FIG. 8. In other words, the external speaker unit 100 may have the speakers 101, audio signal input terminals 102 for inputting the audio signal (in the present embodiment, 2 channels of Lch and Rch) supplied from the connection terminals 29 into the corresponding speakers 101, and a parameter storing portion 103 for storing the external speaker parameter corresponding to the external speaker unit 100.

This parameter storing portion 103 is a tag using the RFID (Radio Frequency IDentification) technology, and the external speaker parameter is stored in its storing section. The data acquiring portion 40 may be constructed as a reader that can communicate with this tag. Accordingly, the data acquiring portion 40 can acquire the external speaker parameter corresponding to the external speaker unit 100 from this external speaker unit 100. In this case, the reader of the data acquiring portion 40 may be provided to a remote controller having a radio communicating section that can communicate via radio, or the like.

Also, the parameter storing portion 103 may be formed of a storing section such as a flash memory, ROM (Read Only Memory), or the like, which stores the external speaker parameter. The data acquiring portion 40 may be connected to the parameter storing portion 103 via cable or radio to acquire the external speaker parameter. Here, the parameter storing portion 103 may be formed of a memory medium such as a flexible disc, CD-ROM, or the like provided separately from the external speaker unit 100. In this case, the data acquiring portion 40 may be provided as a reading section that reads the external speaker parameter stored in the memory medium. In this manner, the data acquiring portion 40 may acquire the parameter by any way if such portion can acquire the external speaker parameter from the outside of the television set 1.

<Variation 2>

Figure 9:
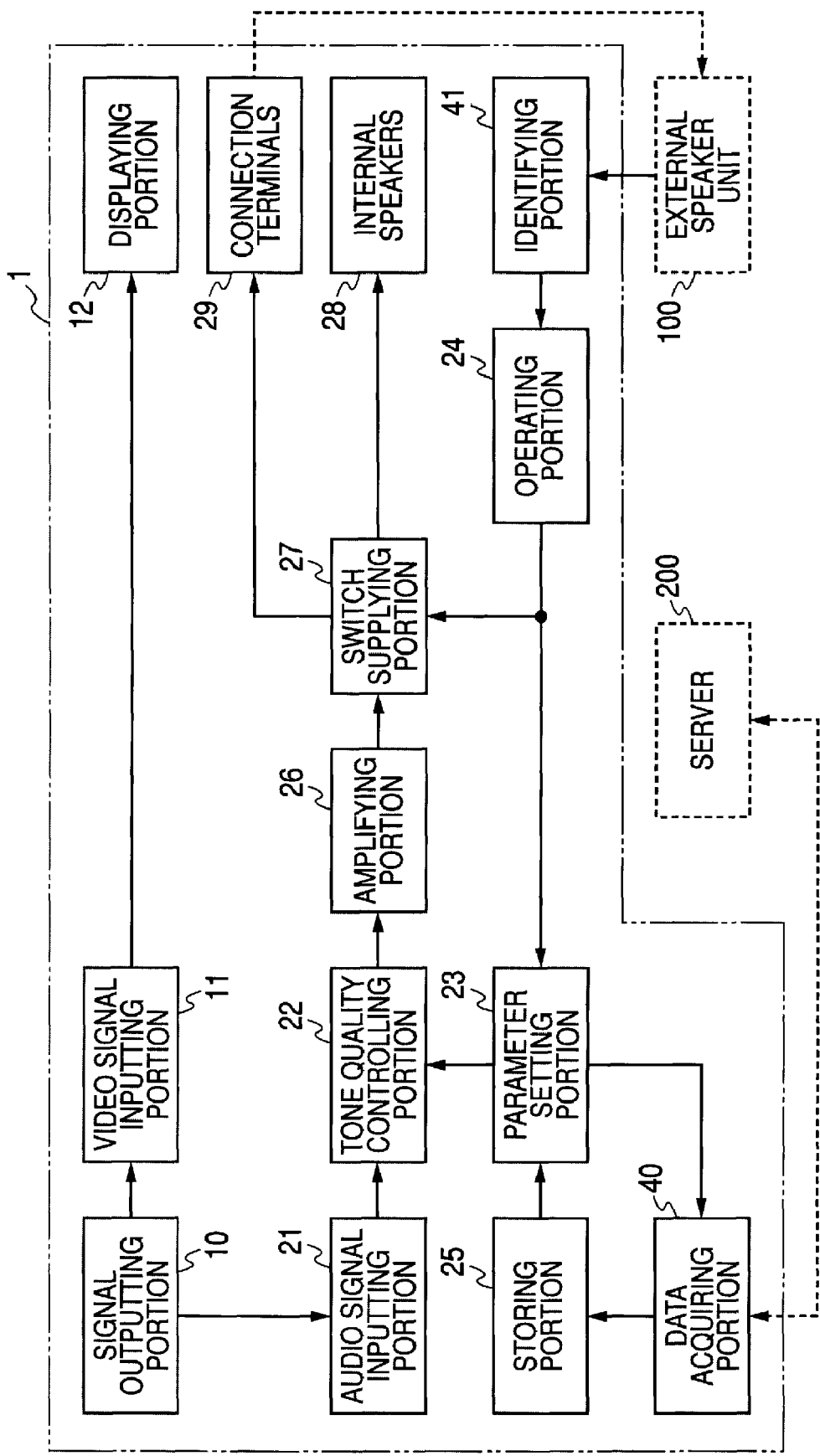
FIG. 9 is a block diagram showing a configuration of a television set according to a variation 2.

In the above embodiment, when the user decides the type of the external speaker unit 100 and inputs the type of the external speaker unit 100 by operating the operating portion 24, the type information indicating the type of the external speaker unit 100 connected to the connection terminals 29 is produced. In this event, as shown in FIG. 9, an identifying portion 41 for identifying the type of the external speaker unit 100 may be provided, and the operating portion 24 may produce the type information indicating the type of the external speaker unit 100 identified by the identifying portion 41. An example of a configuration in this case will be explained hereunder.

Figure 10:
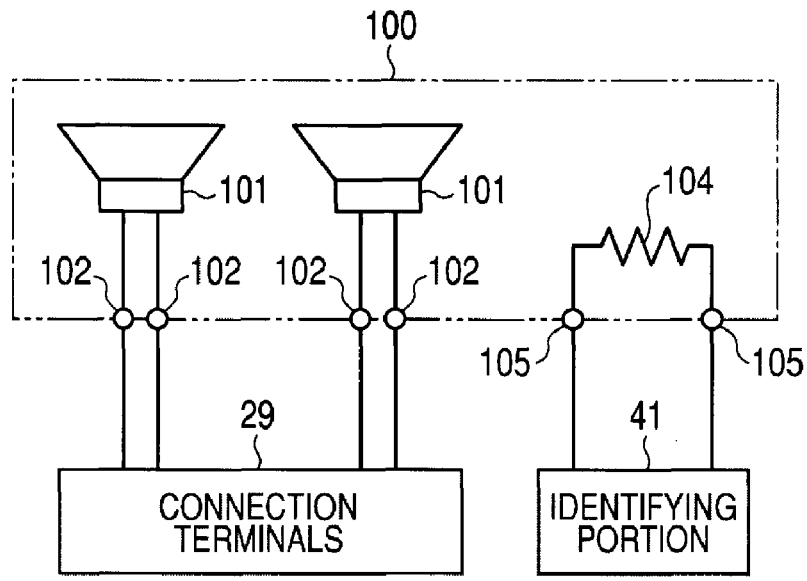
FIG. 10 is a block diagram showing an example of a configuration of an external speaker unit according to the variation 2.

First, as shown in FIG. 10, identification resistors 104 whose resistance value is different every type of the external speaker unit may be provided to the external speaker unit 100, and the storing portion 25 may store a plurality of external speaker parameters corresponding to the resistance values. Then, the identifying portion 41 measures the resistance value of the identification resistor 104 via measuring terminals 105 and outputs the resistance value to the operating portion 24, and the operating portion 24 outputs the type information indicating the resistance value to the parameter setting portion 23. Then, the parameter setting portion 23 reads the external speaker parameter corresponding to the resistance value indicated by the type information from the storing portion 25, and sets the parameter in the tone quality controlling portion 22. In this manner, the identifying portion 41 can identify the type of the external speaker unit 100 by measuring the resistance value of the identification resistor 104 of the external speaker unit 100.

In this case, the resistance value corresponding to the external speaker unit 100 may be set in a predetermined range in view of some variation of the resistance values. In other words, it is desirable that the resistance value should be correlated with a plurality of external speaker parameters stored in the storing portion 25 in a predetermined range respectively. Also, the external speaker parameters stored in the storing portion 25 are similar to the embodiment, a correspondence table that correlates the type of the external speaker unit 100 with the resistance values may be stored in the storing portion 25, and the parameter setting portion 23 may decide the parameter to be read, based on the correspondence table and the type information.

Figure 11:
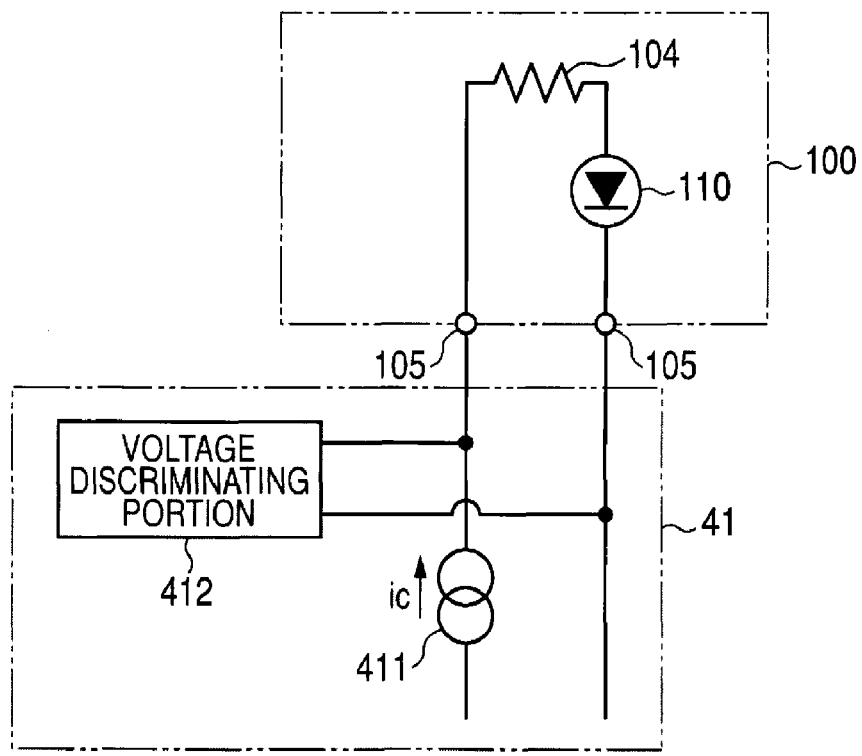
FIG. 11 is an explanatory view showing an example of a circuit configuration of the external speaker unit according to the variation 2.

Also, as shown in FIG. 11, a light emitting element such as LED (Light Emitting Diode) 110, or the like may be provided in series with the identification resistor 104, and may be turned ON when the resistance value of the identification resistor 104 is being measured. As an example of this configuration, the identifying portion 41 may have a constant-current source 411 for supplying a current ic to the identification resistor 104 and the LED 110, and a voltage discriminating portion 412 for measuring a voltage between two measuring terminals 105. Then, the resistance value may be calculated from the measured voltage and the measured current. Then, when the LED 110 is arranged as shown in FIG. 3, the user can view whether or not the resistance value of the identification resistor 104 is being measured. In this case, if the resistance value of the identification resistor 104 is set sufficiently larger than the resistance value of the LED 110 while it is emitting the light, a voltage drop in the LED 110 during the lighting operation can be neglected. Also, when the resistance value of the identification resistor 104 is low, respective resistance values may be set such that a resistance value obtained by adding the resistance value of the LED 110 during the lighting operation to the resistance value of the identification resistor 104 gives the resistance value indicating the type of the external speaker unit 100.

Second, as shown in FIG. 3, a FIG. 107 such as a bar code, a two-dimensional code, or the like, which is different every type of the external speaker unit, is attached to the external speaker unit 100. Then, the identifying portion 41 may read optically the FIG. 107 attached to the external speaker unit 100 by a scanner such as LED, optical sensor, CCD (Charge Coupled Device), or the like, and may identify the type of the external speaker unit 100. In this case, a correspondence table in which the type and the figure are correlated with each other may be prepared in advance, or the external speaker parameter may be correlated directly with the figure.

Figure 12:
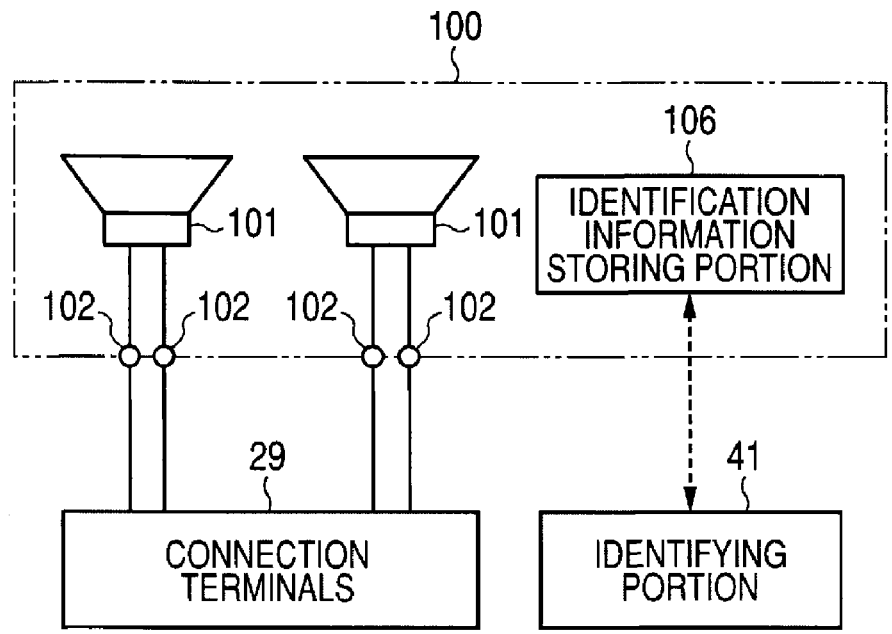
FIG. 12 is a block diagram showing an example of a configuration of the external speaker unit according to the variation 2.

Third, as shown in FIG. 12, an identification information storing portion 106 such as a flash memory, ROM, or the like, which stores the identification information to identify the type, may be provided to the external speaker unit 100. Then, the identifying portion 41 may acquire the identification information stored in the identification information storing portion 106, and may identify the type of the external speaker unit 100. When the identification information storing portion 106 in which the identification information is stored is formed of the storing section of the tag using the RFID technology, for example, and a reader for reading the information stored in the storing section of the tag is provided to the identifying portion 41, the data acquiring portion 40 can acquire the identification information via radio.

Figure 13:
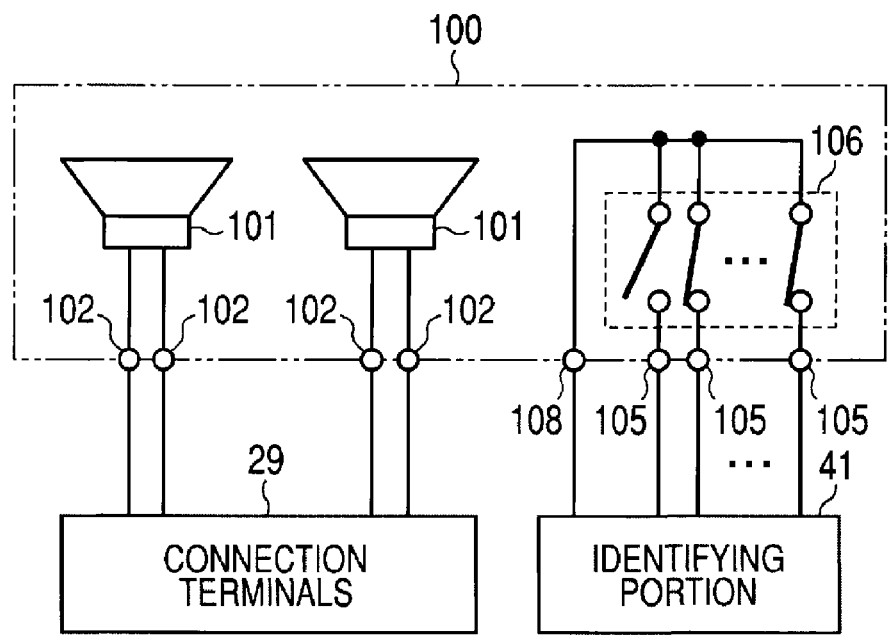
FIG. 13 is an explanatory view showing an example of a circuit configuration of the external speaker unit according to the variation 2.

Also, the identification information storing portion 106 may have a configuration shown in FIG. 13. That is, the identification information storing portion 106 is connected to a plurality of measuring terminals 105 and a reference terminal 108. A plurality of measuring terminals 105 are set to a short-circuit state or an open state with respect to the reference terminal 108 respectively. Then, combinations between positions of the measuring terminals 105 and the short-circuit state and the open state corresponding to respective measuring terminals 105 may be used as the identification information to identify the type of the external speaker unit 100. In this case, the identifying portion 41 may supply a minute current, or the like to respective measuring terminals 105 to recognize whether or not a plurality of measuring terminals 105 are set in the short-circuit state or the open state respectively, and then may identify the type of the external speaker unit 100 based on the combination. Accordingly, when n measuring terminals 105 are provided, for example, 2n types of the external speaker units 100 can be indicated.

As described above, the type of the external speaker units 100 can be identified according to various approaches. Here, when the identifying portion 41 is provided to the remote controller of the operating portion 24, or the like, the user can execute easily the process of identifying the type of the external speaker unit 100. In this case, the remote controller may transmit the identified result to the receiving section in the operating portion 24 by using the radio communicating section. Also, when the measuring terminals 105 are provided to the external speaker unit 100, a line for connecting the connection terminals 29 of the television set 1 and the external speaker unit 100 and a line for connecting the identifying portion 41 and the measuring terminals 105 are constructed collectively as one connection connector to facilitate the connection between the television set 1 and the external speaker unit 100.

<Variation 3>

Figure 14:
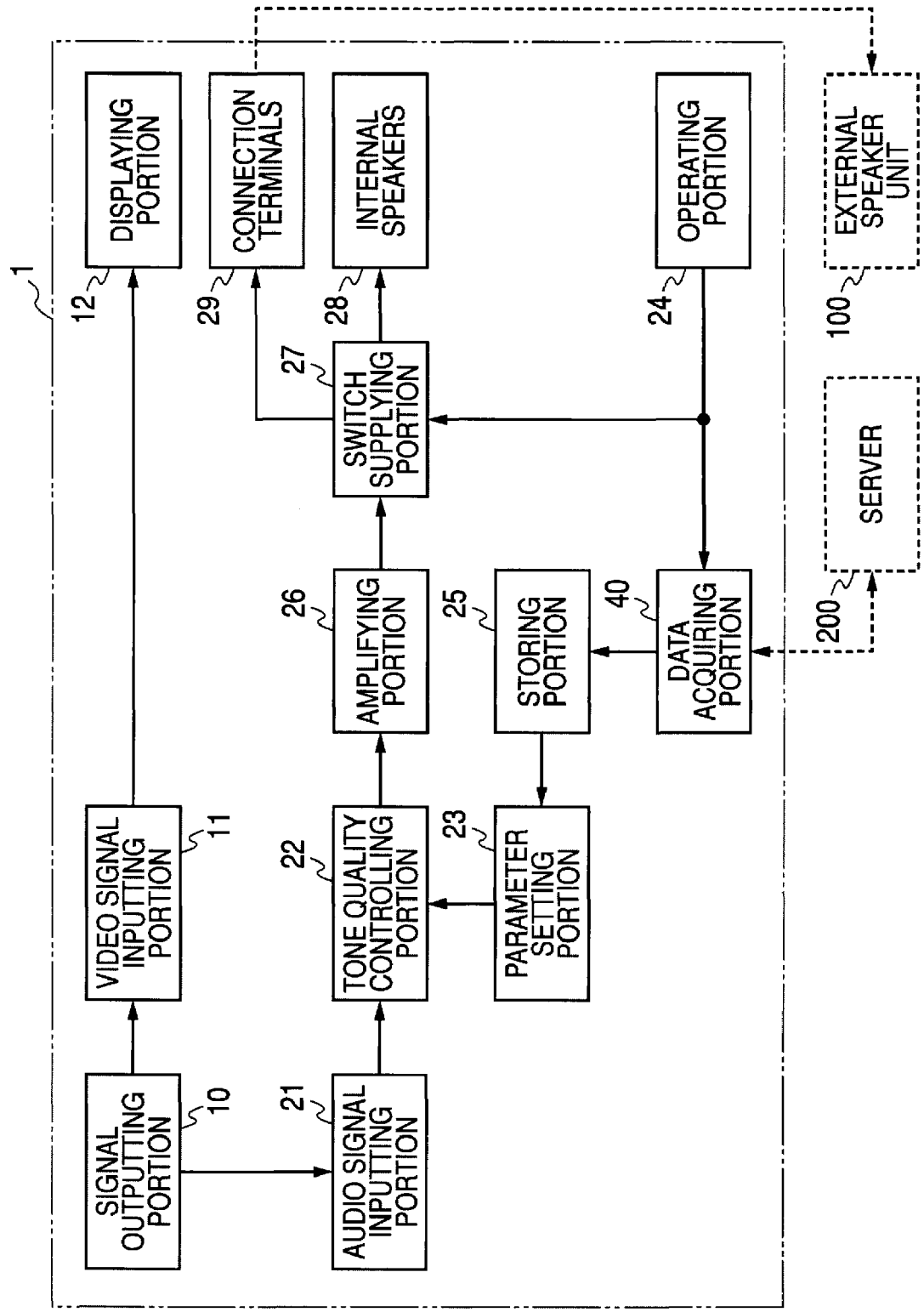
FIG. 14 is a block diagram showing a configuration of a television set according to a variation 3.

In the above embodiment, the storing portion 25 stores the internal speaker parameter and a plurality of external speaker parameters, but may store only one parameter. In this case, as shown in FIG. 14, the operating portion 24 outputs the switch information and the type information to the data acquiring portion 40. Then, when the switch information indicates the internal speaker, the data acquiring portion 40 acquires the internal speaker parameter from the server 200, and stores the parameter in the storing portion 25. In contrast, when the switch information indicates the connection terminals, the data acquiring portion 40 acquires the external speaker parameter corresponding to the type of the external speaker unit 100 that is indicated by the type information from the server 200, and stores the parameter in the storing portion 25. At this time, only the lastly acquired parameter is stored in the storing portion 25. The parameter setting portion 23 reads the parameter stored in the storing portion 25 and sets the parameter in the tone quality controlling portion 22. By doing this, the storing portion 25 may stores only one parameter, so that a memory capacity can be made small and a low cost storing section can be employed. Here, if the internal speaker are contained in the contents that are indicated by the type information, it may be understood that the switch information should indicate the internal speaker when the type information indicates the internal speaker. Therefore, it is possible that the switch information should not be employed.

Also, in the present variation, only one external speaker parameter may be stored in a state that the internal speaker parameter is stored in the storing portion 25. In this case, the switch information being output from the operating portion 24 may be output to the parameter setting portion 23, like the embodiment. Then, when the switch information indicates the connection terminals, the parameter setting portion 23 may read one external speaker parameter stored in the storing portion 25 and set the parameter in the tone quality controlling portion 22 after such portion checked the fact that the external speaker parameter in the storing portion 25 has been updated by the data acquiring portion 40.

<Variation 4>

In the above embodiment, the television set 1 has the video signal inputting portion 11 and the displaying portion 12, but the audio signal supplying device having the configuration of the television set 1 except the video signal inputting portion 11 and the displaying portion 12 may be provided. That is, the television set 1 may be constructed by the audio signal supplying device, the video signal inputting portion 11, and the displaying portion 12. Also, the audio signal supplying device may not have the internal speakers 28, and the sound may be emitted from the external speaker unit 100. In this case, there is necessity that the internal speaker parameter, the switch information, and the switch supplying portion 27 should be used.

<Variation 5>

Figure 15:
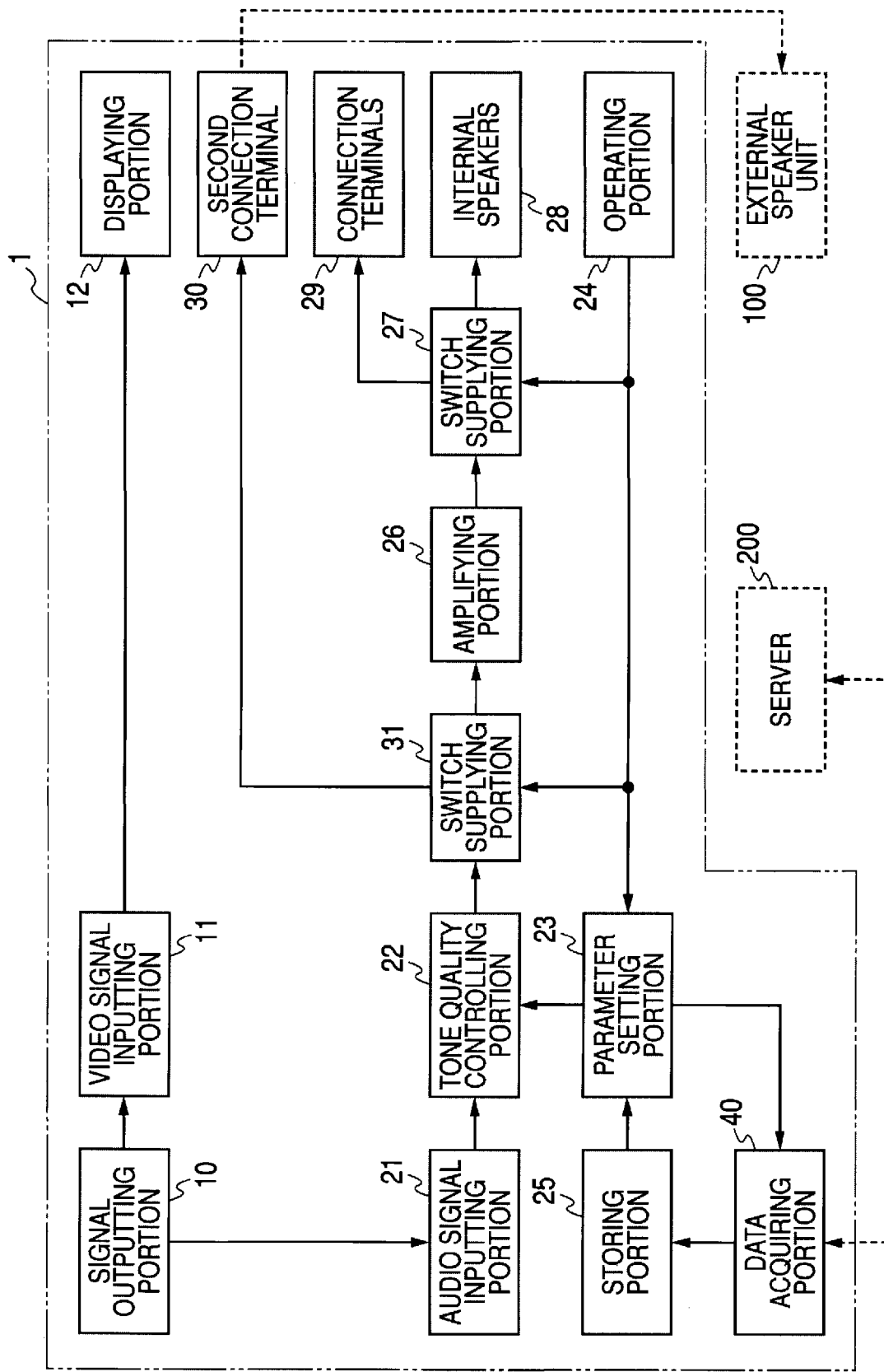
FIG. 15 is a block diagram showing a configuration of a television set according to a variation 5.

In the above embodiment, the terminals to which the external speaker unit 100 is connected are the connection terminals 29 to which the audio signal is supplied from the amplifying portion 26. In this case, as shown in FIG. 15, second connection terminals 30 to which the audio signal prior to the amplification in the amplifying portion 26, i.e., the audio signal whose frequency characteristic is controlled in the tone quality controlling portion 22 is supplied may be provided. In this case, a switch supplying portion 31 may be provided between the tone quality controlling portion 22 and the amplifying portion 26, and then the audio signal which is input from the tone quality controlling portion 22 and whose frequency characteristic is controlled may be output to the amplifying portion 26 when the switch information from the operating portion 24 indicates the internal speakers whereas such audio signal may be output to the amplifying portion 26 and the second connection terminals 30 when the switch information indicates the connection terminals.

In this case, the switch supplying portion 31 may also acquire the type information when the switch information indicates the connection terminals, and then the switch supplying portion 31 may output the audio signal to the second connection terminals 30 when the external speaker unit 100 indicated by the type information has an amplifier whereas the switch supplying portion 31 may output the audio signal to the amplifying portion 26 when the external speaker unit 100 has no amplifier. Here, the decision as to whether or not the external speaker unit 100 indicated by the type information should have the amplifier may be made either based on the information that is input into the type information by operating the operating portion 24 to indicate whether or not the amplifier is provided or by referring to the type information and a correspondence table that is stored in the storing portion 25 to show correspondences between the types of the external speaker unit 100 and presence/absence of the amplifier.

With this arrangement, even when the external speaker unit 100 has the amplifier to amplify the input audio signal, such external speaker unit 100 can be connected to the second connection terminals 30. Therefore, the external speaker unit 100 can be connected to the television set 1 irrespective of whether or not the amplifier is provided. In this case, when the external speaker unit 100 has the amplifier and a circuit for controlling the frequency characteristic, the control of the audio signal in the tone quality controlling portion 22 may be omitted, i.e., the parameter used to output the audio signal whose characteristic is still flat may be set. The decision as to whether or not the external speaker unit 100 should have the amplifier can be made similarly to the decision as to whether or not the amplifier should be provided.

<Variation 6>

In the above embodiment, the tone quality controlling portion 22 is formed of the equalizer that controls the frequency characteristic of the audio signal. But the tone quality controlling portion 22 may control any characteristic if the acoustic characteristic that is changed according to a difference in the layout of the speakers 101 in the external speaker unit 100, a difference in the characteristic, and the like can be controlled. For example, sometimes the surround effect is changed according to a distance between the speakers 101. The parameter used to keep the surround effect constant even in a situation that the type of the external speaker unit 100 is changed is stored in the storing portion 25 in response to the type of the external speaker unit 100. Then, the tone quality controlling portion 22 may apply the control to the input audio signal so as to produce the surround effect in response to the set parameter.

<Variation 7>

Figure 16:
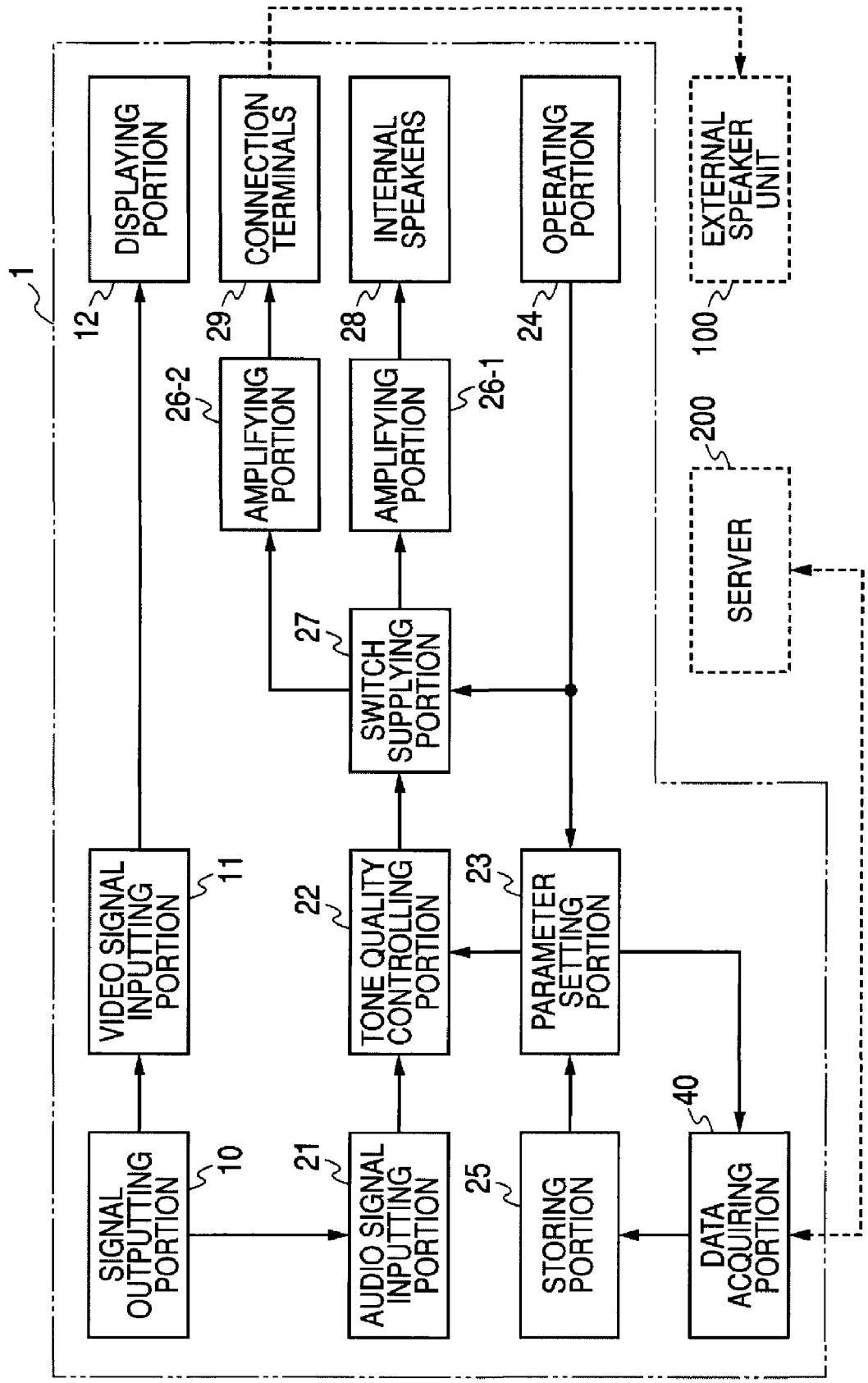
FIG. 16 is a block diagram showing a configuration of a television set according to a variation 7.

In the above embodiment, the audio signal supplied to both the internal speakers 28 and the connection terminals is the audio signal amplified by the same amplifying portion 26. But the audio signals amplified by different amplifying portions 26 respectively may be employed. In this case, as shown in FIG. 16, an amplifying portion 26-1 may be provided between the switch supplying portion 27 and the internal speakers 28, and an amplifying portion 26-2 may be provided between the switch supplying portion 27 and the connection terminals 29. In this situation, the amplifying portion 26-1 may be provided as a low-output amplifier to suit to the internal speakers 28, and the amplifying portion 26-2 may be provided as a high-output amplifier to deal with various external speaker units 100.

Here, when an input impedance is different according to the type of the external speaker unit 100 connected to the connection terminals 29, an output impedance of the amplifying portion 26-1 may be changed in answer to the input impedance or the different connection terminals 29 may be provided every output impedance. When the output impedance is changed in this way, a correspondence table showing correspondences between the types of the external speaker unit 100 and the input impedances may be stored in the storing portion 25, and then the amplifying portion 26-2 may recognize the input impedance of the external speaker unit 100 connected to the connection terminals 29, based on the type information output from the operating portion 24 and the correspondence table stored in the storing portion 25. In this case, similarly the output impedance of the amplifying portion 26 in the embodiment may be changed.

<Variation 8>

Figure 17:
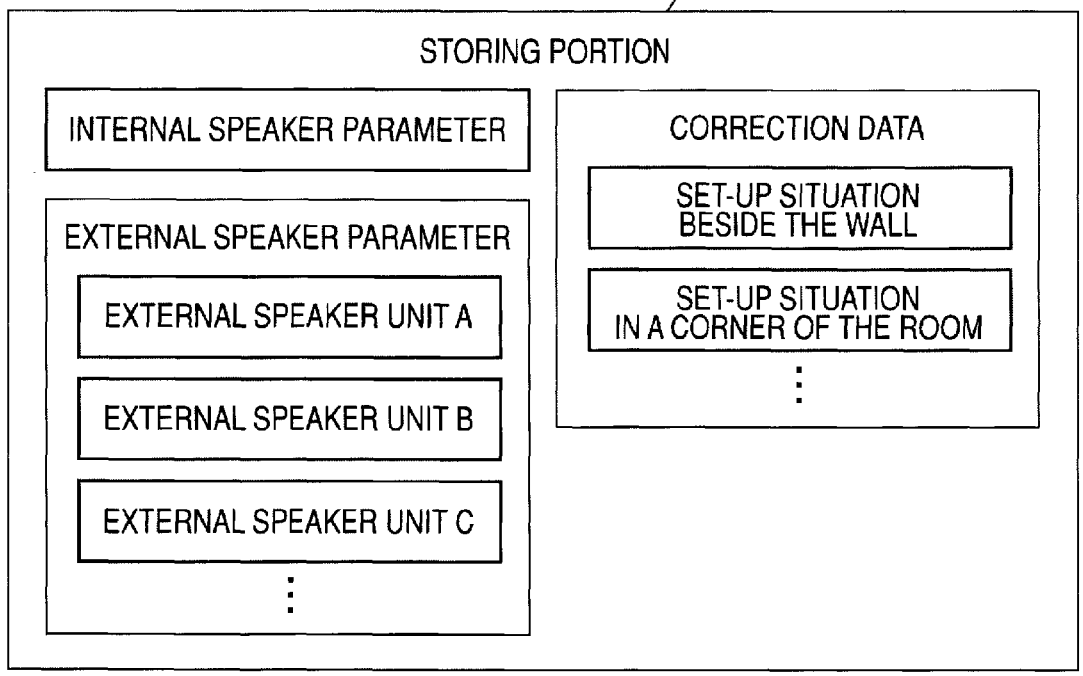
FIG. 17 is an explanatory view of stored contents in a storing portion according to a variation 8.

In the above embodiment, the tone quality controlling portion 22 controls the frequency characteristic of the audio signal based on the set parameter, and makes the same control irrespective of the set-up situation of the external speaker unit 100. But the tone quality controlling portion 22 may change the controlled contents in accordance with the set-up situation. In this case, as shown in FIG. 17, correction data responding to the set-up situation such as "beside the wall", "in a corner of the room", or the like are stored in the storing portion 25. When the set-up situation is input by operating the operating portion 24, set-up situation information is output from the operating portion 24 to the parameter setting portion 23. Then, the parameter setting portion 23 reads the correction data corresponding to the set-up situation that the set-up situation information indicates from the storing portion 25. The external speaker parameter set in the tone quality controlling portion 22 or the set parameter may be corrected based on the read correction data.

When the external speaker unit 100 is set up beside the wall, an effect that a low-pitched sound is reflected by the wall is increased, and thus the sound in which a low-pitched component is emphasized is emitted. Such effect is enhanced when the external speaker unit 100 is set up beside the wall, or the like and neighboring wall surfaces are increased. The correction data are the data that correct the parameter set in the tone quality controlling portion 22 to suppress such effect, for example, the data that lower an output in the low frequency band. Thus, when the correction is applied to the external speaker parameter based on the correction data, such a control is made that the output in the low frequency band of the audio signal is lowered rather than the case no correction is applied. Accordingly, since the portion in which a low-pitched sound is enhanced by the wall reflection becomes the previously controlled audio signal, the external speaker unit 100 can emit the sound with the stable frequency characteristic even when the set-up situation is changed. Here, the variable is not limited to the set-up situation if the frequency characteristic can be corrected. For example, the frequency characteristic may be corrected in response to the watched contents such as movie, music, news, or the like, and also brightness, contrast, etc. may be changed by correcting the video signal.

Figure 18:
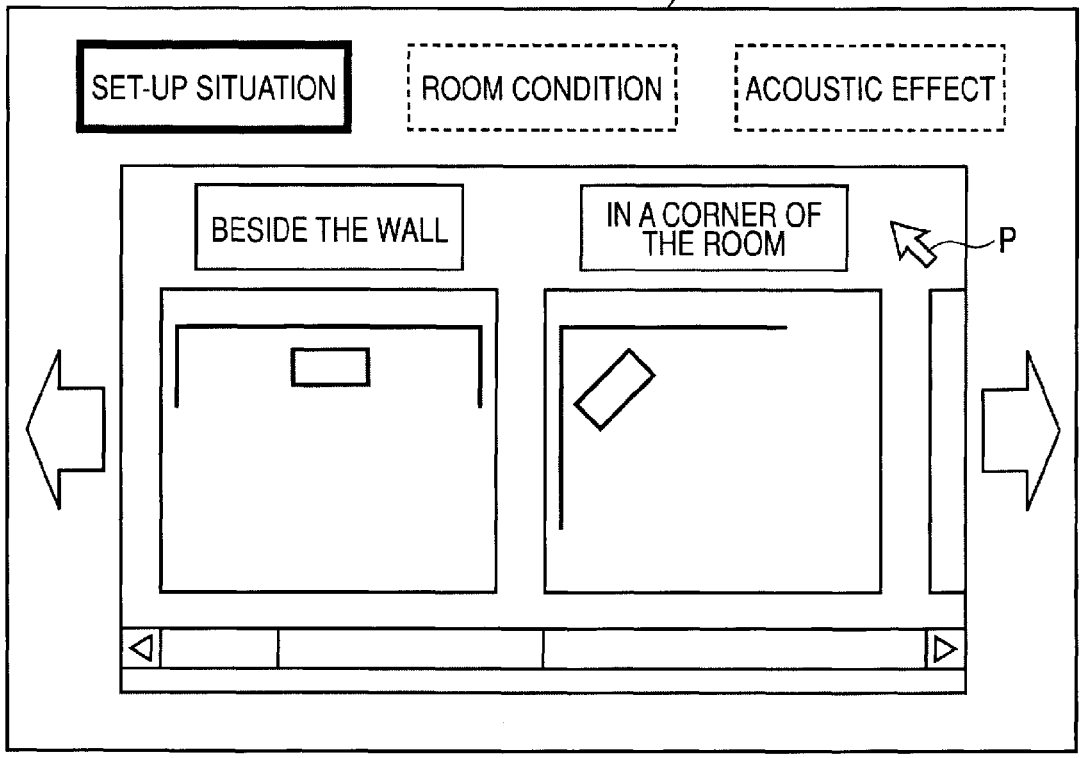
FIG. 18 is an explanatory view showing an example of a display on a display screen according to the variation 8.

Here, when the set-up situation of the external speaker unit 100 is input by operating the operating portion 24, the CPU (not shown) may cause the displaying portion 12 to make a display showing the set-up situation on the display screen 12-D, as shown in FIG. 18, by referring to the correction data stored in the storing portion 25. Then, the set-up situation information may be output when a pointer P is moved by operating the operating portion 24 to choose the set-up situation to be input.

<Variation 9>

In the above embodiment, the tone quality controlling portion 22 is composed of the equalizer that controls the frequency characteristic of the audio signal. But a function of attaching another acoustic effect such as a reverberation effect, or the like may be further provided to the tone quality controlling portion 22. It may be decided by operating the operating portion 24 which acoustic effect should be attached. For example, like Variation 8, various functions may be displayed on the display screen 12-D, as shown in FIG. 18, and any one may be chosen. At this time, a display from which a space of the room, a profile of the room, a reflectance of the wall surface, for example, can be chosen as the condition of the room is made when a "room condition" is chosen, and a display from which the acoustic effect to be attached can be chosen when an "acoustic effect" is chosen.

<Variation 10>

As the external speaker parameter stored in the storing portion 25 in the above embodiment, the parameters that are produced by analyzing the measured results obtained by measuring the acoustic characteristics such as the frequency characteristic, etc. in such a condition that various external speaker units 100 are caused to emit the sound may be employed, otherwise the parameters that are produced by a simulation made based on the speakers, the speaker layout, the internal structure, etc. of the external speaker unit 100 may be employed. That is, the external speaker parameter may be produced in any approach if such parameter is produced based on the frequency characteristic peculiar to the external speaker unit 100, and also the dedicated external speaker parameter corresponding to the type of the external speaker unit may be employed.

<Variation 11>

In the television set 1 of the above embodiment, the tone quality of the internal speakers 28 is worsened on account of the slimming down. In order to improve the tone quality, the external speaker unit 100 is provided. Accordingly, it is desirable that respective longitudinal, lateral, and depth dimensions of the external speaker unit 100 should be set larger than the depth (the direction perpendicular to the display screen 12-D) of the housing 50 of the television set 1. Also, it is desirable that a volume of the enclosure in which the speakers of the external speaker unit 100 are housed should be larger than a volume of the enclosure in which the internal speakers 28 of the housing 50, or the like are housed.

<Variation 12>

The external speaker unit 100 connected to the television set 1 in the above embodiment is constructed as shown in FIG. 3, for example. Other examples of the external speaker unit 100 connected to the television set 1 will be explained hereunder.

Figure 19A:
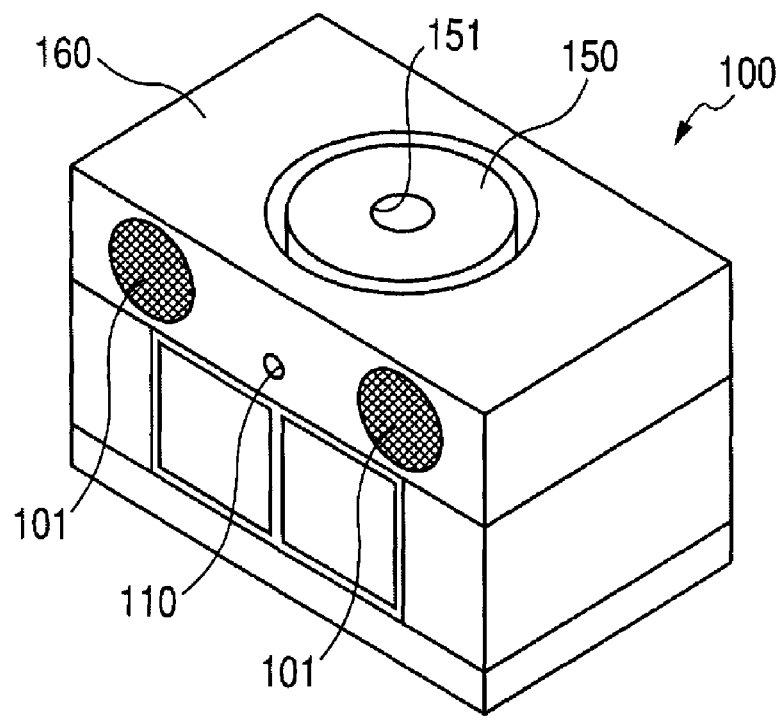
FIGS. 19A and 19B are explanatory views showing an example of an external appearance of an external speaker unit according to a variation 12.
Figure 19B:
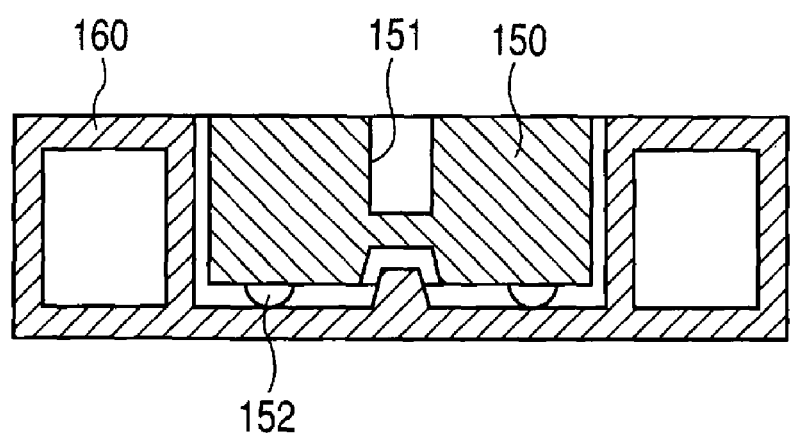

As a first example, as shown in FIG. 19A, the external speaker unit 100 has a turn table 150 around a center of an upper surface of a housing 160. When the television set 1 is put on the turn table 150, the display screen 12-D of the television set 1 can be easily directed in a desired direction. Also, a circular cylinder-like opening portion 151 may be provided in the center portion of the turn table 150. FIG. 19B is a view showing a sectional shape of the external speaker unit 100 taken along a surface that passes through a center axis of the turn table 150 when the opening portion 151 is opened. A rotary supporting portion roller 152 is provided between the turn table 150 and the housing 160 such that the turn table 150 can be turned on the housing 160. Also, a projection portion is provided to a portion of the housing 160 corresponding to the center shaft of the turn table 150, and a recess portion is provided to a corresponding portion of the turn table 150. Thus, the rotary shaft body 52 is held.

Then, when the configuration that the foot stand 51 of the television set 1 can be removed from the rotary shaft body 52 is employed, the housing 50 of the television set 1 can be supported by inserting the rotary shaft body 52 of the television set 1 into the opening portion 151. At this time, a fixing section for fixing a relative positional relationship between the rotary shaft body 52 and the turn table 150 in the opening portion 151 may be provided such that the rotary shaft body 52 and the turn table 150 are coupled to each other. In this case, the audio signal input terminal 102 connected to the connection terminals 29 may be provided on the upper surface of the turn table 150 or the inner surface of the opening portion 151. It is desirable that, when the audio signal input terminal 102 is provided on the inner surface of the opening portion 151, the connection terminals 29 should be provided to the rotary shaft body 52 of the television set 1. With this arrangement, the relative positional relationship between the television set 1 and the audio signal input terminal 102 is not changed even when the turn table 150 is turned. Therefore, the turn table 150 can be turned without limitation of the length of the connection cable for connecting the television set 1 and the external speaker unit 100, and the like.

Figure 20A:
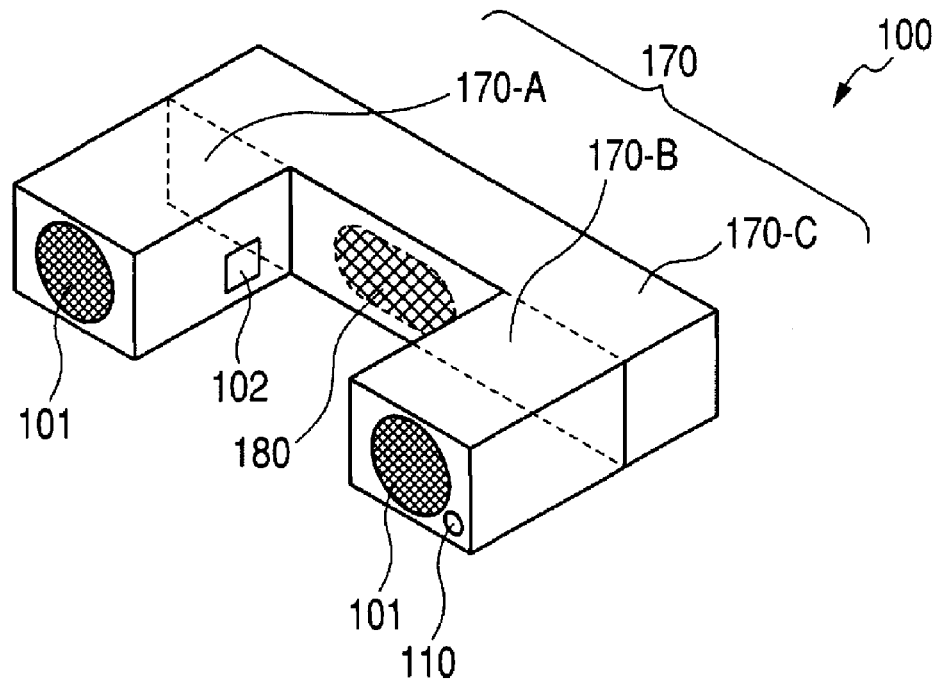
FIGS. 20A and 20B are explanatory views showing the example of the external appearance of the external speaker unit according to the variation 12.

As a second example, as shown in FIG. 20A, the external speaker unit 100 has a U-shaped housing 170 that consists of two rectangular housings (referred to as a "housing 170-A" and a "housing 170-B" hereinafter) provided to one surface of the speaker 101 and a housing (referred to as a "housing 170-C" hereinafter) connected two housings through the surface opposite to the surface to which the speaker 101 is provided, and is formed generally like a U-shaped form. Because such structure is employed, the external speaker unit 100 can be provided to avoid the foot stand 51 of the television set 1 and the rotary shaft body 52. Therefore, the external speaker unit 100 can be provided while utilizing effectively a space that is created between the upper surface of the television stand on which the television set 1 is put and the housing 50 of the television set 1. Here, in FIG. 20B, the connecting portions between the housings 170-A, 170-B and the housing 170-C are shaped to have corners. But the connecting portions may be shaped roughly like a U-shape and the connecting portions may be formed by curved surfaces without the corners.

In such external speaker unit 100, a subwoofer 180 for outputting the sound in the low frequency band may be provided to an area of the housing 170-C. Also, it is desirable that, as shown in FIG. 20A, the audio signal input terminal 102 should be provided to either of the surfaces on the inside of the U-shaped housing 170, i.e., respective opposing surfaces of the housing 170-A and the housing 170-B and the surface of the housing 170-C connecting respective surfaces.

Figure 20B:
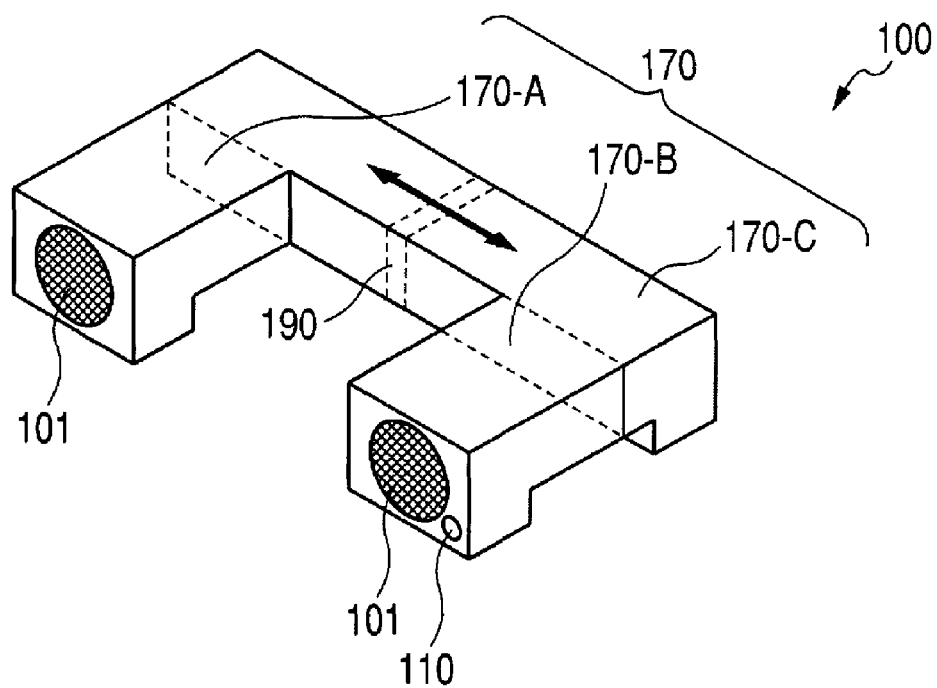

Also, as shown in FIG. 20B, when such a structure that a part of the external speaker unit 100 is floated from the set-up surfaces is employed as the structure in which a space is provided to a part of the lower surface side of the U-shaped housing 170, a part of the foot stand 51 of the television set 1 can be built in this space. A distance between the housing 170-A and the housing 170-B is merely needed to such an extent that the rotary shaft body 52 of the television set 1 can be avoided, a downsizing of the external speaker unit 100 can be achieved. Also, as indicated with a broken line in FIG. 20B, an expanding portion 190 capable of varying the distance between the housing 170-A and the housing 170-B by expanding/contracting the length of the housing 170-C may be provided. In this manner, the U-shaped housing 170 can be adjusted in an appropriate size to suit to respective sizes of the housing 50 of the television set 1, the foot stand 51, and the rotary shaft body 52. In this case, the expanding portion 190 may be provided to the housing 170-A and the housing 170-B.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2007-303726 filed on Nov. 22, 2007, the contents of which are incorporated herein for reference.

What is claimed is:

1. An audio signal supplying device, comprising:
a connection terminal which is connected to a speaker unit and which outputs an audio signal to the speaker unit;
a specifying section which specifies a type of the speaker unit connected to the connection terminal;
an acquiring section which acquires a parameter corresponding to the type of the speaker unit specified by the specifying section from an outside;
a storing section which stores the parameter acquired by the acquiring section;
an inputting section into which the audio signal is input;
an acoustic characteristic controlling section which adjusts an acoustic characteristic of the audio signal input into the inputting section, based on the parameter stored in the storing section; and
a supplying section which supplies the audio signal whose acoustic characteristic is adjusted by the acoustic characteristic controlling section to the connection terminal.

2. The audio signal supplying device according to claim 1, further comprising:
an identifying section which identifies the type of the speaker unit connected to the connection terminal,
wherein the specifying section specifies the type of the speaker unit identified by the identifying section as the type of the speaker unit connected to the connection terminal.

3. The audio signal supplying device according to claim 2, wherein the identifying section identifies the type of the speaker unit connected to the connection terminal by measuring a resistance value of an identification resistor provided in the speaker unit.

4. The audio signal supplying device according to claim 2, wherein the identifying section identifies the type of the speaker unit connected to the connection terminal by optically reading a figure attached to the speaker unit.

5. The audio signal supplying device according to claim 2, wherein the identifying section identifies the type of the speaker unit connected to the connection terminal by acquiring identification information stored in a storing section in the speaker unit.

6. The audio signal supplying device according to claim 2, wherein the identifying section has a radio communicating section;
wherein the identifying section transmits information indicating the type of the identified speaker unit to the specifying section via the radio communicating section; and
wherein the specifying section receives the information transmitted by the radio communicating section, and specifies a type of the speaker unit indicated by the information as the type of the speaker unit connected to the connection terminal.

7. The audio signal supplying device according to claim 1, further comprising:
a deciding section that decides whether or not a parameter corresponding to the type of the speaker unit which is specified by the specifying section is stored in the storing section,
wherein, when the deciding section decides that the parameter corresponding to the type of the speaker unit specified by the specifying section is not stored in the storing section, the acquiring section acquires the parameter corresponding to the type of the speaker unit from the outside;
wherein the storing section stores the type of the speaker unit corresponding to the parameter and the parameter so as to correlate mutually every time when the acquiring section acquires the parameter; and
wherein the acoustic characteristic controlling section adjusts the acoustic characteristic based on the parameter corresponding to the type of the speaker unit specified by the specifying section, out of parameters stored in the storing section.

8. The audio signal supplying device according to claim 1, wherein the acquiring section transmits request information indicating the type of the speaker unit specified by the specifying section to a server connected to a network, and acquires the parameter corresponding to the type of the speaker unit connected to the connection terminal by receiving the parameter transmitted from the server in response to the request.

9. The audio signal supplying device according to claim 1, wherein the acquiring section acquires the parameter corresponding to the type of the speaker unit connected to the connection terminal by reading the parameter stored in the storing section of the speaker unit connected to the connection terminal.

10. A parameter providing system, comprising:
an audio signal supplying device; and
a server which is connected to the audio signal supplying device through a network,
wherein the audio signal supplying device, including:
  a connection terminal which is connected to a speaker unit and which outputs an audio signal to the speaker unit;
  a specifying section which specifies a type of the speaker unit connected to the connection terminal;
  an acquiring section transmits request information indicating the type of the speaker unit specified by the specifying section to the server through the network and acquires the parameter corresponding to the type of the speaker unit connected to the connection terminal by receiving the parameter transmitted from the server in response to the request;
  an inputting section into which the audio signal is input;
  an acoustic characteristic controlling section which adjusts an acoustic characteristic of the audio signal input into the inputting section, based on the parameter received by the receiving section; and
  a supplying section which supplies the audio signal whose acoustic characteristic is adjusted by the acoustic characteristic controlling section to the connection terminal; and
wherein the server, including:
  a server storing section which stores a plurality of parameters corresponding to types of the speaker units; and
  a transmitting section which transmits the parameter corresponding to the type of the speaker unit indicated by the request information through the network, out of parameters stored in the server storing section, to the audio signal supplying device.

11. A television set, comprising:
the audio signal supplying device according to claim 1;
a displaying section which displays an image on a display screen based on an input video signal; and
an internal speaker arranged in a vicinity of the display screen, and which emits a sound based on the supplied audio signal,
wherein the storing section stores a parameter corresponding to the internal speaker;
wherein the supplying section supplies the audio signal whose acoustic characteristic is adjusted by the acoustic characteristic controlling section to the connection terminal or the internal speaker; and
wherein the acoustic characteristic controlling section adjusts the acoustic characteristic based on the parameter corresponding to the internal speaker stored in the storing section, when the supplying section supplies the audio signal to the internal speaker.

12. An AV system, comprising:
the television set according to claim 11; and
a television stand equipped with a speaker apparatus connected to the connection terminal.

13. A speaker apparatus connected to an audio signal supplying device which supplies an audio signal whose acoustic characteristic is adjusted on the basis of a parameter to the speaker apparatus, the parameter being acquired from the speaker apparatus to the audio signal supplying device, the speaker apparatus comprising:
an inputting section connected to a connection terminal of the audio signal supplying device and to which the audio signal is input through the connection terminal;
a speaker which emits a sound based on the audio signal input from the inputting section; and
a storing section which stores parameters used in the audio signal supplying device.

14. A speaker apparatus connected to an audio signal supplying device which specifies a type of the speaker apparatus based on a measured result of a resistance value of an identification resistor provided in the speaker apparatus, acquires a parameter corresponding to the specified type of the speaker apparatus from the speaker apparatus to the audio signal supplying device, and supplies an audio signal whose acoustic characteristic is adjusted on the basis of the acquired parameter, the speaker apparatus comprising:
an inputting section connected to a connection terminal of the audio signal supplying device and to which the audio signal is input through the connection terminal;
a speaker which emits a sound based on the audio signal input from the inputting section;
an identification resistor which shows a predetermined resistance value; and
a measuring terminal which connects the identification resistor to the audio signal supplying device.

15. An audio signal supplying method applied to an audio signal supplying device equipped with a connection terminal to which a speaker unit is connected and which outputs an audio signal to the speaker unit, comprising:
specifying a type of the speaker unit connected to the connection terminal;
acquiring a parameter corresponding to the type of the speaker unit specified in the specifying process from an outside;
storing the parameter acquired in the acquiring process in a storing section;
inputting the audio signal;
adjusting an acoustic characteristic of the audio signal input in the inputting process, based on the parameter stored in the storing section; and
supplying the audio signal whose acoustic characteristic is adjusted in the acoustic characteristic controlling process to the connection terminal.

* * * * *